(12) United States Patent
Yushin et al.

(10) Patent No.: US 12,148,921 B2
(45) Date of Patent: Nov. 19, 2024

(54) MULTI-SHELL STRUCTURES AND FABRICATION METHODS FOR BATTERY ACTIVE MATERIALS WITH EXPANSION PROPERTIES

(71) Applicant: Sila Nanotechnologies, Inc., Alameda, CA (US)

(72) Inventors: Gleb Nikolayevich Yushin, Atlanta, GA (US); Bogdan Zdyrko, Atlanta, GA (US); Alexander Thomas Jacobs, Atlanta, GA (US); Eerik Torm Hantsoo, Oakland, CA (US); Addison Newcomb Shelton, Atlanta, GA (US); Eugene Michael Berdichevsky, Alameda, CA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 0 days.

(21) Appl. No.: 18/343,208

(22) Filed: Jun. 28, 2023

(65) Prior Publication Data

US 2023/0343939 A1   Oct. 26, 2023

Related U.S. Application Data

(63) Continuation of application No. 13/919,818, filed on Jun. 17, 2013, now abandoned.
(Continued)

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/386* (2013.01); *H01M 4/583* (2013.01); *H01M 4/587* (2013.01); *H01M 10/052* (2013.01)

(58) Field of Classification Search
CPC ...... H01M 4/366; H01M 4/386; H01M 4/583; H01M 4/587; H01M 10/052; H01M 4/625; Y02E 60/10
(Continued)

(56) References Cited

U.S. PATENT DOCUMENTS

2008/0261116 A1\* 10/2008 Burton .................... C23C 16/24
427/113
2010/0285358 A1\* 11/2010 Cui ........................ H01M 4/663
429/231.5
(Continued)

FOREIGN PATENT DOCUMENTS

EP          2862220 B1    5/2022

*Primary Examiner* — Christian Roldan
(74) *Attorney, Agent, or Firm* — MUNCY, GEISSLER, OLDS & LOWE, P.C.; Daniel Podhajny

(57) ABSTRACT

Battery electrode compositions are provided comprising core-shell composites. Each of the composites may comprise, for example, an active material, a collapsible core, and a shell. The active material may be provided to store and release metal ions during battery operation, whereby the storing and releasing of the metal ions causes a substantial change in volume of the active material. The collapsible core may be disposed in combination with the active material to accommodate the changes in volume. The shell may at least partially encase the active material and the core, the shell being formed from a material that is substantially permeable to the metal ions stored and released by the active material.

30 Claims, 16 Drawing Sheets

Related U.S. Application Data

(60) Provisional application No. 61/661,336, filed on Jun. 18, 2012.

(51) Int. Cl.
  *H01M 4/583* (2010.01)
  *H01M 4/587* (2010.01)
  *H01M 10/052* (2010.01)

(58) Field of Classification Search
  USPC .......................................................... 429/231
  See application file for complete search history.

(56) References Cited

U.S. PATENT DOCUMENTS

| | | | |
|---|---|---|---|
| 2010/0330421 A1* | 12/2010 | Cui | H01M 4/134 |
| | | | 977/948 |
| 2012/0321959 A1* | 12/2012 | Yushin | H01M 4/366 |
| | | | 252/502 |
| 2013/0319870 A1* | 12/2013 | Chen | H01M 4/587 |
| | | | 977/734 |

\* cited by examiner

MULTI-SHELL STRUCTURES AND FABRICATION METHODS FOR BATTERY ACTIVE MATERIALS WITH EXPANSION PROPERTIES

CROSS REFERENCE TO RELATED APPLICATIONS

The present application for patent Continuation of U.S. patent application Ser. No. 13/919,818, entitled "MULTI-SHELL STRUCTURES AND FABRICATION METHODS FOR BATTERY ACTIVE MATERIALS WITH EXPANSION PROPERTIES," filed on Jun. 17, 2013, which claims priority to Provisional Application No. 61/661,336 entitled "Multi Shell Structures Designed for Battery Active Materials with Expansion Properties" filed on Jun. 18, 2012, each of which is expressly incorporated by reference herein.

BACKGROUND

Field

The present disclosure relates generally to energy storage devices, and more particularly to metal-ion battery technology and the like.

Background

Owing in part to their relatively high energy densities, light weight, and potential for long lifetimes, advanced metal-ion batteries such as lithium-ion (Li-ion) batteries are desirable for a wide range of consumer electronics. However, despite their increasing commercial prevalence, further development of these batteries is needed, particularly for potential applications in low- or zero-emission hybrid-electrical or fully-electrical vehicles, consumer electronics, energy-efficient cargo ships and locomotives, aerospace applications, and power grids.

Accordingly, there remains a need for improved batteries, components, and other related materials and manufacturing processes.

SUMMARY

Embodiments disclosed herein address the above stated needs by providing improved battery components, improved batteries made therefrom, and methods of making and using the same.

According to various embodiments, various battery electrode compositions are provided comprising core-shell composites. Each of the composites may comprise, for example, an active material, a collapsible core, and a shell. The active material may be provided to store and release metal ions during battery operation, whereby the storing and releasing of the metal ions causes a substantial change in volume of the active material. The collapsible core may be disposed in combination with the active material to accommodate the changes in volume. The shell may at least partially encase the active material and the core, the shell being formed from a material that is substantially permeable to the metal ions stored and released by the active material.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

The present disclosure provides for the use and formation of active core-shell composites designed to accommodate volume changes experienced by certain active materials during battery operation, in which the insertion and extraction of metal ions may cause the active material to significantly expand and contract. According to various embodiments described in more detail below, a "collapsible" core is provided in combination with the active material and one or more shell layers that may be variously deployed for different purposes. The collapsible core inside the composite structure provides space for expansion of the active material during insertion of the ions (e.g. metal ions, such as Li ions) during the battery operation. The shell may be variously constructed of different layers to provide, for example, protection of the surface of the active material from undesirable reactions with air or with a binder solvent used in electrode formation, to provide further volume accommodations for expansion/contraction of the active material, to provide an outer (rigid) structure relatively permeable to the metal ions but, in some cases, relatively impermeable to electrolyte solvent(s) in order to have a smaller electrode surface area in direct contact with the electrolyte, and to provide other advantages described in more detail below. Reduction in the electrode/electrolyte interfacial area allows for fewer undesirable reactions during battery operation. For example, in cases where the core-shell composite particles are used in an anode of a metal-ion battery with an organic solvent-based electrolyte operating in a potential range, when the electrolyte undergoes a reduction process with the solid electrolyte interphase (SEI) formation, preventing electrolyte solvent transport into the core by making a shell largely impermeable to the solvent reduces the total SEI content and irreversible electrolyte and metal ion consumption. Furthermore, by reducing or largely preventing the core-shell composite particles from changing their outer dimensions, a significantly more stable SEI layer can be established. Composites of this type have been shown to exhibit high gravimetric capacity (e.g., in excess of about 400 mAh/g for anodes and in excess of about 200 mAh/g for cathodes) while providing enhanced structural and electrochemical stability.

Figure 1:
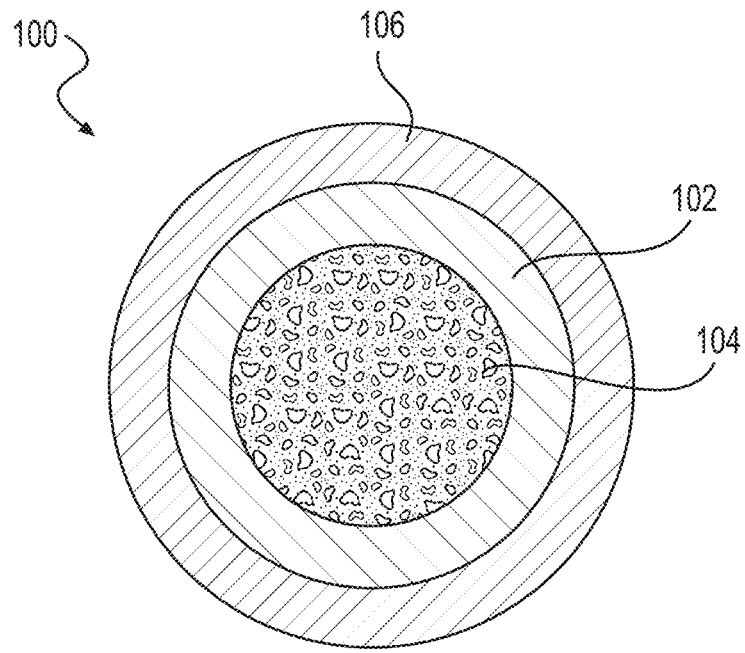
FIG. 1 illustrates an example battery electrode composition comprising core-shell composites according to certain example embodiments.

FIG. 1 illustrates an example battery electrode composition comprising core-shell composites according to certain example embodiments. As shown, each of the composites 100 includes an active material 102, a collapsible core 104, and a shell 106. The active material 102 is provided to store and release metal ions during battery operation. As discussed above, for certain active materials of interest (e.g., silicon), the storing and releasing of these metal ions (e.g., Li ions in a Li-ion battery) causes a substantial change in volume of the active material, which, in conventional designs, may lead to irreversible mechanical damage, and ultimately a loss of contact between the individual electrode particles or the electrode and underlying current collector. Moreover, it may lead to continuous growth of the SEI around such volume-changing particles. The SEI growth, in turn, consumes metal ions and reduces cell capacity. In the design shown here, however, the collapsible core 104 is disposed in combination with the active material 102 to accommodate such changes in volume by allowing the active material 102 to expand inward into the collapsible core 104 itself, rather than expanding outward. The shell 106 at least partially encases both the active material 102 and the core 104. The shell 106 may be formed from various layers but in general includes a material that is substantially permeable to the metal ions stored and released by the active material, so as not to impede battery operation.

In some embodiments, the collapsible core 104 may be formed from a porous material that absorbs the changes in volume via a plurality of open or closed pores. In general, the porosity may be between about 20% and about 99.999% void space by volume, or more preferably, between about 50% and about 95% void space. In the design of FIG. 1, the pores may be kept small enough to keep the active material 102 from depositing inside the core 104 during synthesis, and instead deposit on the outside of the core 104 as shown. In some embodiments, the porous material of the core 104 may also be electrically-conductive to enhance electrical conductivity of the active material 102 during battery operation. An example porous material is a carbon sphere made from carbonized polymer precursors which is then activated (e.g., by exposure to an oxygen containing environment such as $CO_2$ gas or $H_2O$ vapors at elevated temperatures of around 500-1100° C.) to remove about 50% to about 95% of the material in, preferably, sub-3 nm pores. The porous material may also advantageously be electrochemically inert in the battery, such as a porous polymer having no reduction-oxidation reactions in the potential range where ions are inserted or extracted from the electrode, though materials such as carbon (generally not inert if used as an anode in a Li-ion cell, for example) may also be advantageous.

Various methods may be utilized to produce core-shell composites such as the one shown in FIG. 1. For example, one method for the production of a silicon-based active material with a central carbon-based collapsible core and carbon-based shell includes the following steps: (a) synthesize mono dispersed polymer particles (e.g., using a polyDVB monomer); (b) oxidize the particles (e.g., at approximately 250° C., for around 8 hours); (c) carbonize the particles to form solid carbon spheres (e.g., at around 900° C. and 10 torr, for around 1 hour); (d) activate the carbon spheres to remove most of the mass and leave a highly porous (e.g., greater than about 90% pores) core structure behind (e.g., at around 1015° C., for around 12 hours), having pores that are generally small (e.g., less than around 3 nm); (e) deposit the silicon (in this example) active material onto the porous cores via thermal decomposition from silane ($SiH_4$) (e.g., at approximately 525° C. in Ar at 1 torr, for around 1 hour); and (f) deposit a shell, such as a protective carbon coating (discussed in more detail below) via thermal decomposition from a carbon precursor (e.g., at approximately 900° C. in $C_2H_4$ at 10 torr, for about 5 hours). It may be beneficial to mix the particles between steps to reduce agglomeration during deposition.

In the design of FIG. 1, the active material 102 is shown as at least partially encasing the porous material of the core 104. With a highly porous, but solid core, deposition of the active material 102 as a coating around the core 104 is relatively straightforward and the impact of any defects that may be introduced during fabrication is relatively minimal. However, in other embodiments, the relationship between the active material 102 and the core 104 may be modified to achieve other advantages for a given application.

Figure 2:
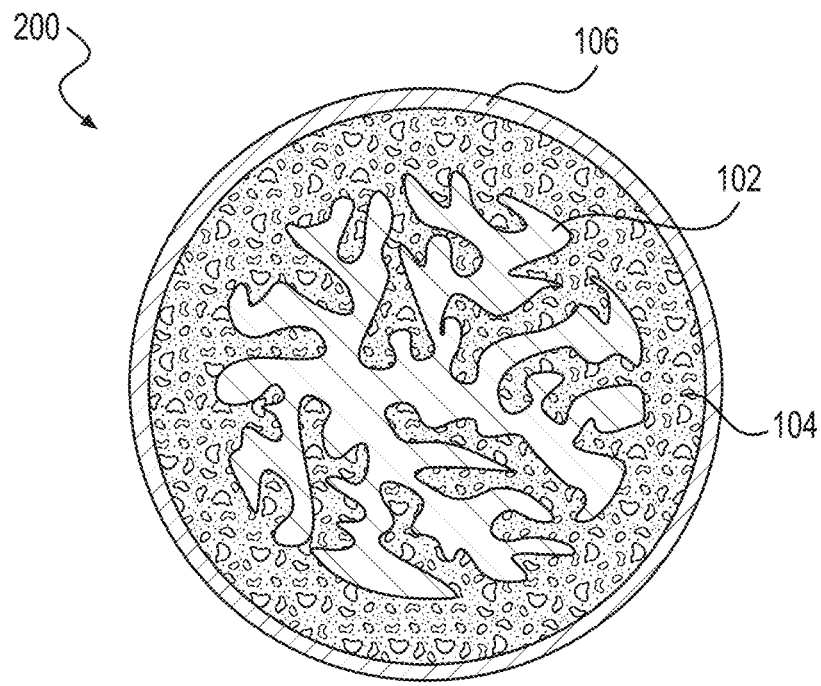
FIG. 2 illustrates an alternative example core-shell composite design according to other example embodiments.

FIG. 2 illustrates an alternative example core-shell composite design according to other example embodiments. In this design, the composite 200 is formed such that the active material 102 is interspersed with the porous material of the core 104. Here, the porous material should be ionically conductive and electrically conductive. The advantage of this design is that smaller stresses are induced in the shell 106 because much of the stress caused during the expansion of the active material 102 is dissipated by the core 104. As a result, the outer shell 106 can be made thinner but nonetheless remain functional (and largely defect-free) during battery operation. In addition, higher interfacial area between the active material 102 and the core 104 helps to retain good ionic and electrical transport within the core-shell composite during battery operation.

In such designs, the porous material of the collapsible core 104 may be provided not only as an amorphous structure but also include a porous substrate formed of one or more curved linear or planar backbones, for examples.

Figure 3:
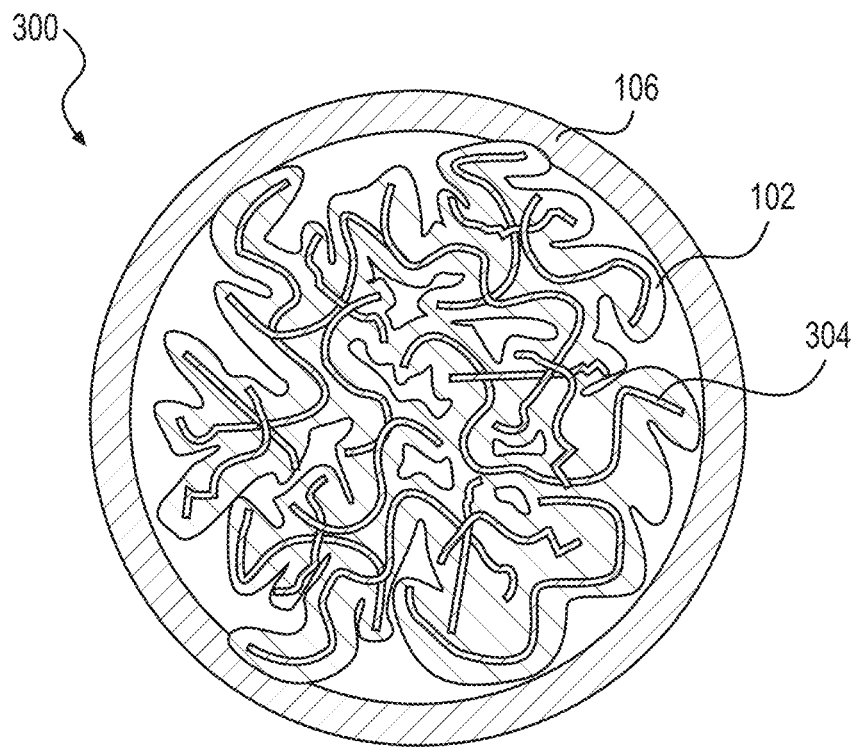
FIG. 3 illustrates a particular example core-shell composite design utilizing a curved linear backbone according to other example embodiments.

FIG. 3 illustrates a particular example core-shell composite design utilizing a curved linear backbone according to other example embodiments. In this design, the composite 300 is formed from a collection of curved linear backbones 304 serving as the collapsible core and providing a substrate for the active material 102. The curved linear backbones 304 may comprise, for example, porous carbon strands with large pores, the surface of which can be coated with the active material 102. The curved nature of the linear backbones 304 also introduces an element of porosity into the design. It may be advantageous for this backbone to be electrically conductive and ionically conductive. In some designs, the linear building blocks of the linear backbone 304 can be composed of linked nanoparticles. Advantages of the linear backbone 304 include its open structure, which makes it easy for this structure to be coated uniformly by an active material using, for example, vapor deposition or electroless deposition methods. This is because the diffusion of the precursor for the active material within the open framework structure of the curved linear backbone is fast. In addition, after this deposition, the active material coated linear backbone can remain sufficiently flexible and robust and thus withstand mixing, calendaring, and various handling procedures without failure.

Figure 4:
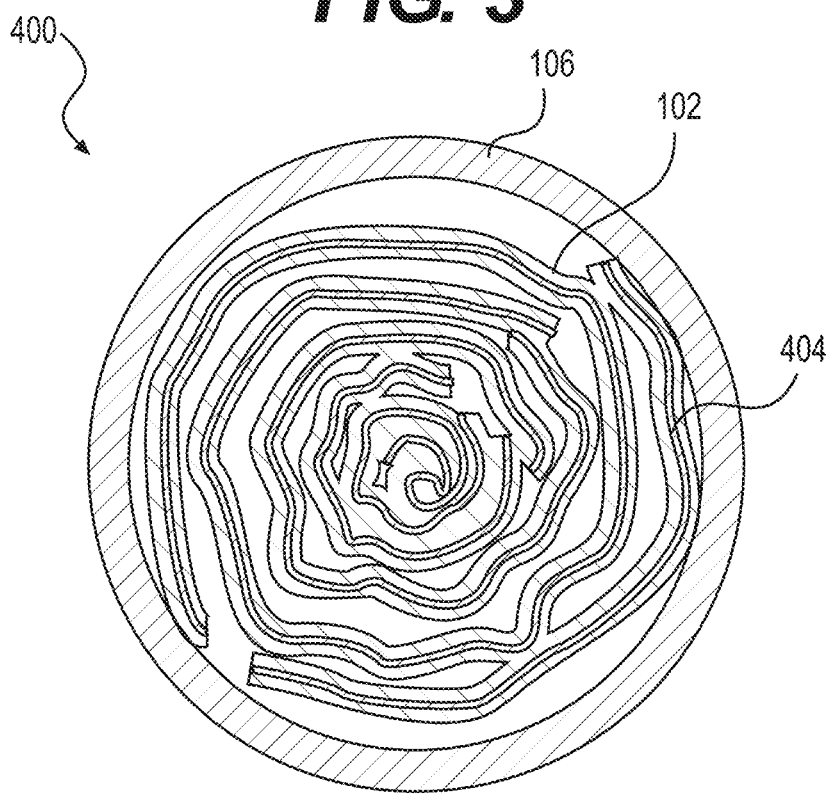
FIG. 4 illustrates a particular example core-shell composite design utilizing a curved planar backbone according to other example embodiments.

FIG. 4 illustrates a particular example core-shell composite design utilizing a curved planar backbone according to other example embodiments. In this design, the composite 400 is formed from a collection of curved planar backbones 404 serving as the collapsible core and providing a substrate for the active material 102. The curved planar backbones 404 may comprise, for example, carbon (nano) flakes such as exfoliated graphite or multi-layered graphene, the surface of which can be coated with the active material 102. The curved nature of the planar backbones 304 also introduces an element of porosity into the design. One advantage of the planar backbone is its optimal use of the pore space available to accommodate the volume changes in active material. In addition, the curved planar morphology may provide high structural integrity to both the core and the overall core-shell composite. Further, the curved planar morphology makes it easy to deposit a conformal shell 106 encasing the composite particles.

In each of these designs, the different substrates may be combined with a porous filler material to further enhance the overall porosity of the collapsible core. The porous filler material may be similar to that discussed above in conjunction with the design of FIG. 1, leading to a composite or hybrid design.

Figure 5:
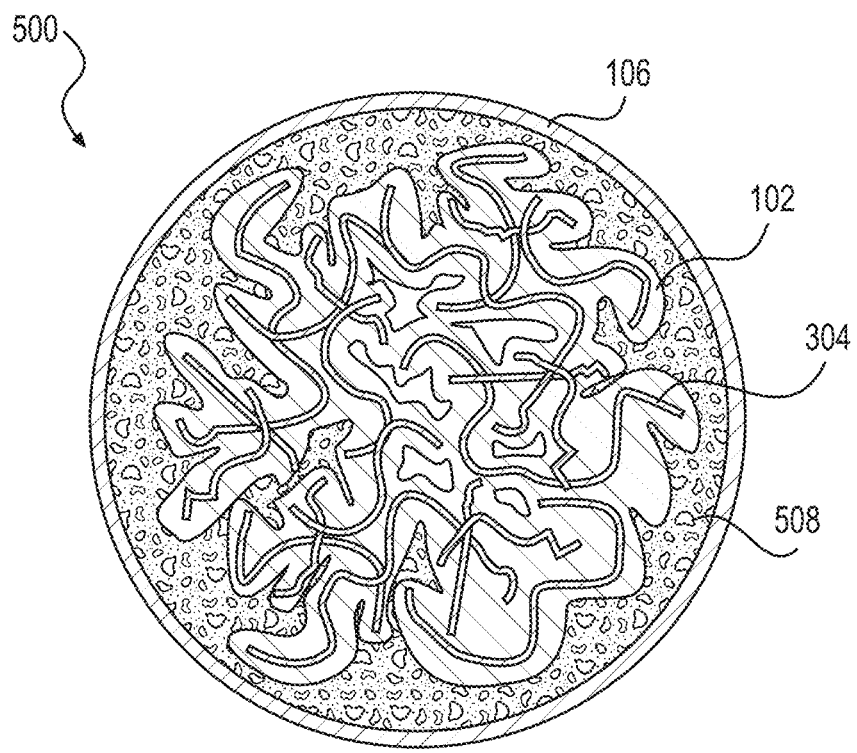
FIGS. 5-6 illustrate two example core-shell composite designs utilizing a porous substrate in combination with a porous filler according to other example embodiments.
Figure 6:
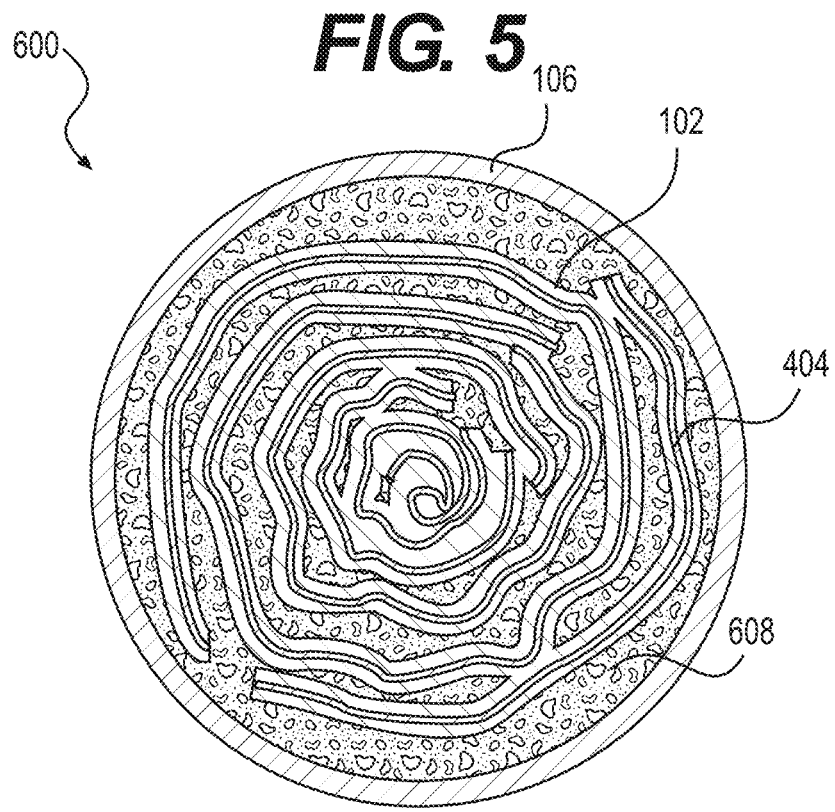

FIGS. 5-6 illustrate two example core-shell composite designs utilizing a porous substrate in combination with a porous filler according to other example embodiments. The first example composite 500 in FIG. 5 is similar to the design of FIG. 3 in which the porous substrate includes a collection of curved linear backbones 304. Here, the composite 500 further includes a porous filler 508 interspersed with the curved linear backbones 304 deployed as the porous substrate. The second example composite 600 in FIG. 6 is similar to the design of FIG. 4 in which the porous substrate includes a collection of curved planar backbones 404. Here, the composite 600 further includes a porous filler 608 interspersed with the curved planar backbones 404 deployed as the porous substrate. The material used for the filler 508, 608 should ideally be electrically and ionically conductive. In some designs, it may also be advantageous to have a strong, electrically and ionically conductive interface between both the active material 102 and the filler 508, 608, as well as between the shell 106 and the filler 508, 608. In this case, the battery operation would be more reliable and higher power performance would be achieved. In order to reduce the interfacial resistance between the active material 102 and the filler 508, 608, the active material 102 can be coated with a thin interfacial layer. Conductive carbon is an example of such a layer, which may improve, for example, electrical conductivity of this interface in some designs.

Returning to FIG. 1, in some designs, the collapsible core 104 may be formed in such a way so as to form a substantial void in the center of each composite that provides additional accommodation for changes in volume of the active material 102.

Figure 7:
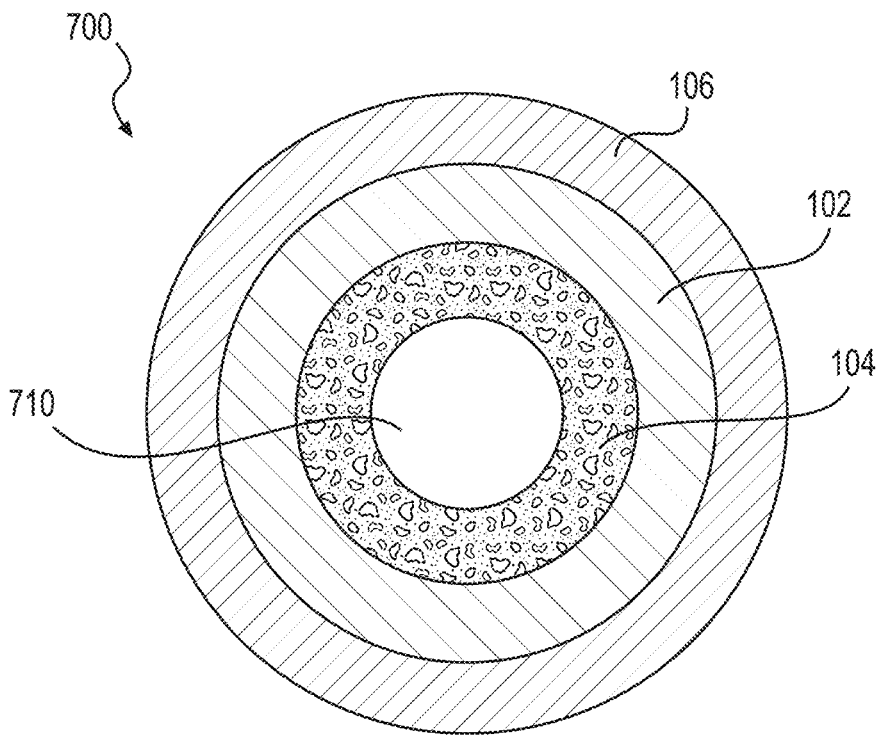
FIG. 7 illustrates a particular example core-shell composite design having a central void according to other example embodiments.

FIG. 7 illustrates a particular example core-shell composite design having a central void according to other example embodiments. As shown, the composite 700 is formed such that the collapsible core 104 includes a central void 710 that is encased (at least indirectly) by the active material 102. One way in which the central void 710 may be formed, for example, is by polymerizing two different monomers, such as polystyrene and polyDVB. First, a solid polymer core may be created from polystyrene, followed by a polymer shell created from polyDVB. A subsequent carbonization process may be used to remove the polystyrene core (with little or no residual material) while creating a carbon residual from the polyDVB to form a shell with a hollow center. This structure may then be left as is (as a solid) or activated to remove additional material until a desired thickness is reached.

In some applications, it may be advantageous for the thickness of any substantive material of the collapsible core 104 to be made relatively thin in relation to the central void 710. For example, it may be made no thicker than is needed to stay intact during further processing. Alternatively, the substantive material of the collapsible core 104 may be removed altogether or nearly altogether such that the central void 710 directly contacts the active material 102 at one or more points.

Figure 8:
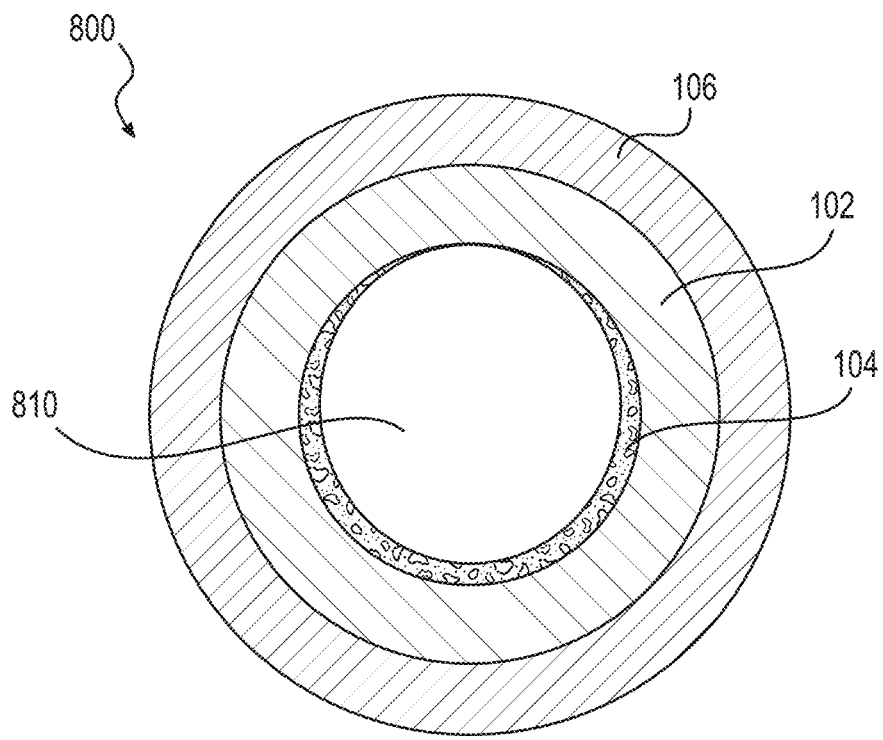
FIG. 8 illustrates a particular example core-shell composite design having a larger central void according to other example embodiments.

FIG. 8 illustrates a particular example core-shell composite design having a larger central void according to other example embodiments. In this design, the composite 800 is formed such that the collapsible core 104 includes a larger central void 810 that is encased (at least indirectly) by the active material 102 and formed large enough within the collapsible core 104 so as to contact the active material 102 at one or more points.

Returning again to FIG. 1, the shell 106 may be formed in a variety of ways and include a variety of layers each specially designed to provide corresponding functionality. For example, the shell 106 may include a protective coating at least partially encasing the active material 102 and the core 104 to prevent oxidation of the active material 102. The shell 106 may also include a porous coating at least partially encasing the active material 102 and the core 104 to further accommodate changes in volume, within or among the composites.

Figure 9:
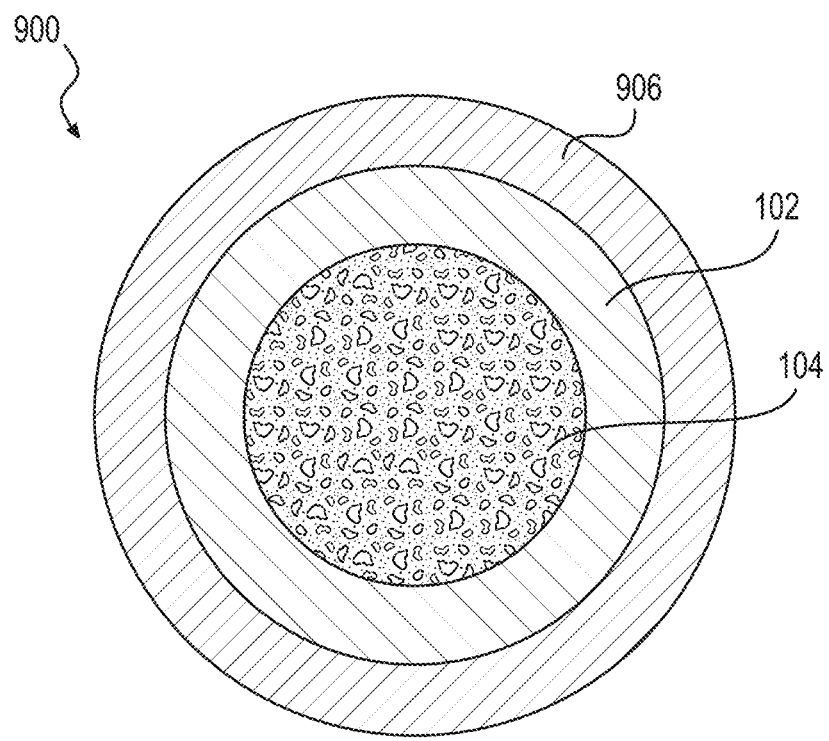
FIG. 9 illustrates a particular example core-shell composite design where the shell includes a protective coating according to certain example embodiments.

FIG. 9 illustrates a particular example core-shell composite design where the shell includes a protective coating according to certain example embodiments. Here, the composite 900 includes an active material 102, a collapsible core 104, and a protective coating 906, serving as the shell 106 in the more generic design of FIG. 1. As shown, the protective coating 906 at least partially encases the active material 102 and the core 104. It will be appreciated that the active material 102 and the core 104 are shown for illustration purposes as in the more generic design of FIG. 1, but may be implemented according to any of the various embodiments disclosed herein.

The protective coating 906 may be provided, for example, to prevent oxidation of the active material 102. In some applications, it may be particularly important to avoid oxidation of the surface of the active material 102 after its synthesis. One such application is in cases where a thin (e.g., 1-2 nm) surface layer comprises a substantial amount (e.g., more than about 10%) of the total volume of active material. For example, small nanoparticles of silicon with a diameter of 3 nm have nearly 90% of their volume within a 1 nm surface layer. Therefore exposure of the 3 nm silicon particles to air and the resulting formation of a native oxide would result in a nearly complete oxidation. Deposition and use of the protective coating 906 on the surface of freshly synthesized active material before any exposure to air or other oxidizing media reduces or prevents such an oxidation.

An example method for depositing a carbon-based protective coating without exposure of a synthesized silicon-based active material to air is as follows. The carbon layer can be deposited by chemical vapor deposition of carbon from one of various hydrocarbon precursors, such as acetylene and propylene, to name a few. In one embodiment, the deposition may be conducted in the same reactor where silicon deposition or formation is performed. In another embodiment, the chamber where silicon is deposited may be subsequently filled with an inert gas (such as argon or helium) and sealed with valves. To minimize leaks in the system, a positive (above atmospheric) pressure may be applied. The sealed chamber may then be transferred into a carbon deposition tool. The chamber may be connected to the gas lines of the carbon deposition tool, while remaining sealed. Prior to opening the valve connecting the silicon-containing chamber and the carbon-deposition tool gas lines, the line to the carbon precursor may be evacuated and filled with either an inert gas or a hydrocarbon gas in such a way so as to minimize the content of water or oxygen molecules within the system that are to be exposed to silicon during the carbon deposition process. In another embodiment, the particles can be transferred internally between silicon and carbon deposition zones using gravity or other powder transfer means.

It may be advantageous to have the total number of oxygen atoms in the system be at least twenty times smaller than the total number of silicon atoms in the silicon nanopowder or silicon nanostructures contained within the chamber and to be protected from oxidation by the carbon layer. In one example, the silicon-containing chamber filled with an inert gas may be heated to an elevated temperature of between about 500-900° C. After the desired temperature is reached, the carbon precursor gas (vapor) may be introduced into the system, depositing a carbon layer onto the silicon surface. In some embodiments, it may be advantageous to perform carbon deposition in sub-atmospheric pressures (for example, at about 0.01-300 torr) in order to form a more crystalline, conformal layer with better protective properties. After the deposition of the protective carbon, the chamber can be cooled down to below 300° C., or preferably below 60° C., prior to exposure to air. For this carbon layer to serve as an effective protective barrier against oxidation, the thickness of the conformal carbon layer should meet or exceed approximately 1 nm.

Figure 10:
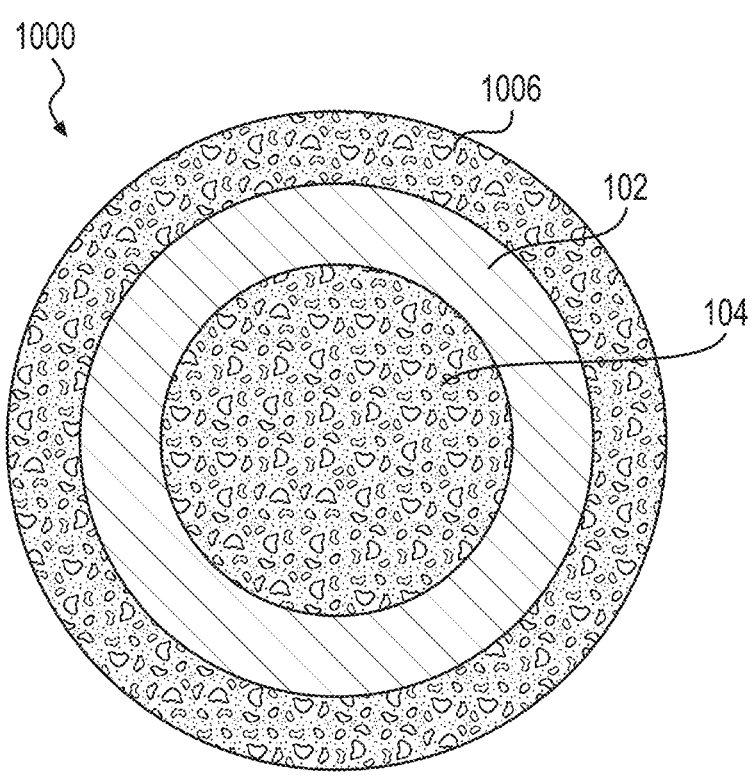
FIG. 10 illustrates a particular example core-shell composite design where the shell includes a porous coating according to certain example embodiments.

FIG. 10 illustrates a particular example core-shell composite design where the shell includes a porous coating according to certain example embodiments. Here, the composite 1000 includes an active material 102, a collapsible core 104, and a protective coating 1006, serving as the shell 106 in the more generic design of FIG. 1. As shown, the protective coating 1006 at least partially encases the active material 102 and the core 104. Here, the porous coating 1006 is formed with a plurality of open or closed pores to further accommodate changes in volume. It will again be appreciated that the active material 102 and the core 104 are shown for illustration purposes as in the more generic design of FIG. 1, but may be implemented according to any of the various embodiments disclosed herein.

In some embodiments, the porous coating 1006 may be composed of a porous electrically-conductive carbon. An example process for the formation of a porous carbon layer includes formation of a polymer coating layer and its subsequent carbonization at elevated temperatures (e.g., between about 500-1000° C., but below the thermal stability of the active material or the active material's reactivity with the carbon layer). This results in the formation of a carbon containing pores. Additional pores within the carbon can be formed as desired upon activation under certain conditions, with the oxidation rate of the active material being significantly lower than the oxidation (activation) rate of porous carbon. In other embodiments, the porous coating 1006 may comprise a polymer-carbon mixture. In still other embodiments, the porous coating 1006 may comprise a polymer electrolyte. Polyethylene oxide (PEO) infiltrated with a Li-ion salt solution is an example of a polymer electrolyte. If a polymer electrolyte does not have mixed (both electronic and ionic) conductivities (as in the case of PEO) but only a significant ionic conductivity, the porous shell may further comprise an electrically conductive component, such as carbon, in order to inject electrons or holes into the active material during battery operation.

As noted above, according to various embodiments, the pores of the porous coating 1006 may be open or closed. In either case, the various pores may further include different functional fillers, used alone or in combination, as discussed in more detail below.

Figure 11:
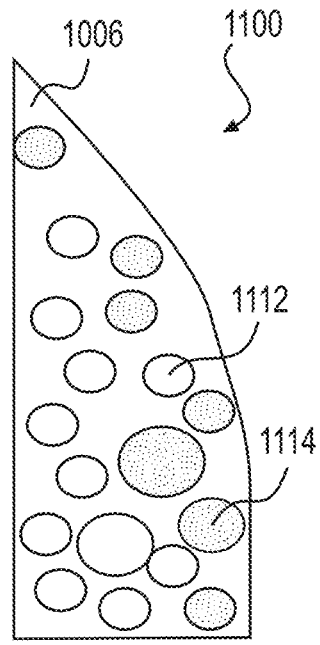
FIGS. 11-14 are cutaway views of a portion of different example porous coatings for use as a shell in various embodiments.
Figure 12:
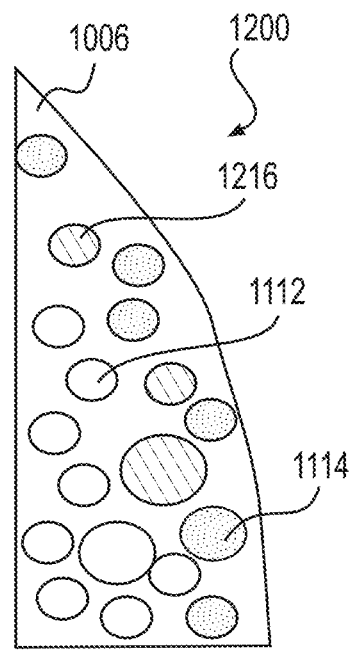
Figure 13:
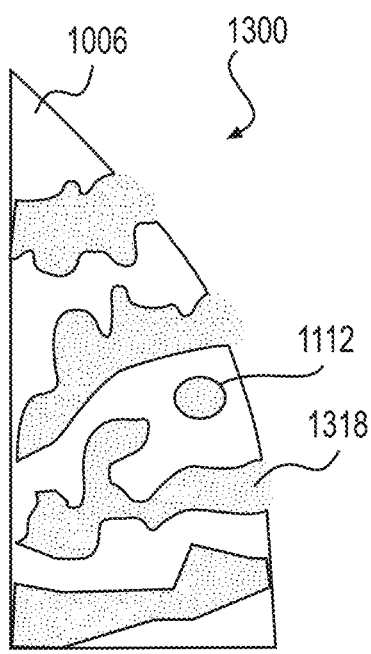
Figure 14:
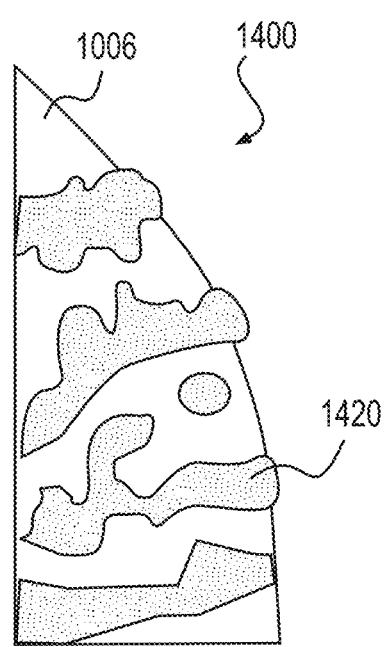

FIGS. 11-14 are cutaway views of a portion of different example porous coatings for use as a shell in various embodiments. FIG. 11 illustrates an example design 1100 of the porous coating 1006 shown in FIG. 10 in which a plurality of closed pores 1112 are present, at least some of the pores 1112 being filled with a first functional filler material 1114. FIG. 12 illustrates an example design 1200 of the porous coating 1006 shown in FIG. 10 in which a plurality of closed pores 1112 are again present, and at least some of the pores 1112 are again filled with the first functional filler material 1114. However, in this design, at least some other pores 1112 are filled with a second functional filler material 1216, creating a composite material of different functional fillers. FIG. 13 illustrates an example design 1300 of the porous coating 1006 shown in FIG. 10 in which a plurality of open pores 1318 are present and interpenetrating the porous coating 1006. In some designs, the open pores 1318 may be formed in combination with the closed pores 1112, as shown. FIG. 14 is an example design 1400 of the porous coating 1006 shown in FIG. 10 in which a plurality of open pores 1318 and closed pores 1112 are present and filled with a given functional filler material 1420.

In some applications, particularly in those where formation of some fraction of small cracks is likely, it is advantageous that at least a fraction of the pores within the porous coating be filled with functional fillers such as electrolyte additives, which are capable of sealing the micro-cracks formed within such a layer during metal-ion insertion into the active particle core and the resulting volume changes. One example of such an additive is a vinylene carbonate (VC) optionally mixed with a metal-ion (such as Li-ion) containing salt. Another example of such an additive is an initiator for radical polymerization, capable of inducing polymerization of the electrolyte solvent(s). Conventional use of these additives (such as VC) has been limited to Li-ion battery electrolytes, without any such infiltration or incorporation within a porous layer around the active particles. This approach improves stability of the composite electrodes without significantly sacrificing other advantageous properties of the bulk electrolyte. In addition, it allows one to use different additives within porous layers on the surfaces of anodes and cathodes.

In some designs, the shell may be a composite material comprising at least an inner layer and an outer layer, with potentially one or more other layers as well. The shell may accordingly be made by combining different coatings of the types described above and the different layers may be provided for different functions. For example, one component of the shell may provide better structural strength, and another one better ionic conductivity. In another example, one component can provide better ionic conductivity, and another one better electrical conductivity. In some applications, it may be advantageous to have these components interpenetrate each other. In this case, the composite shell may provide both high ionic and electrical conductivity if one component is more electrically conductive and another one more ionically conductive.

Figure 15:
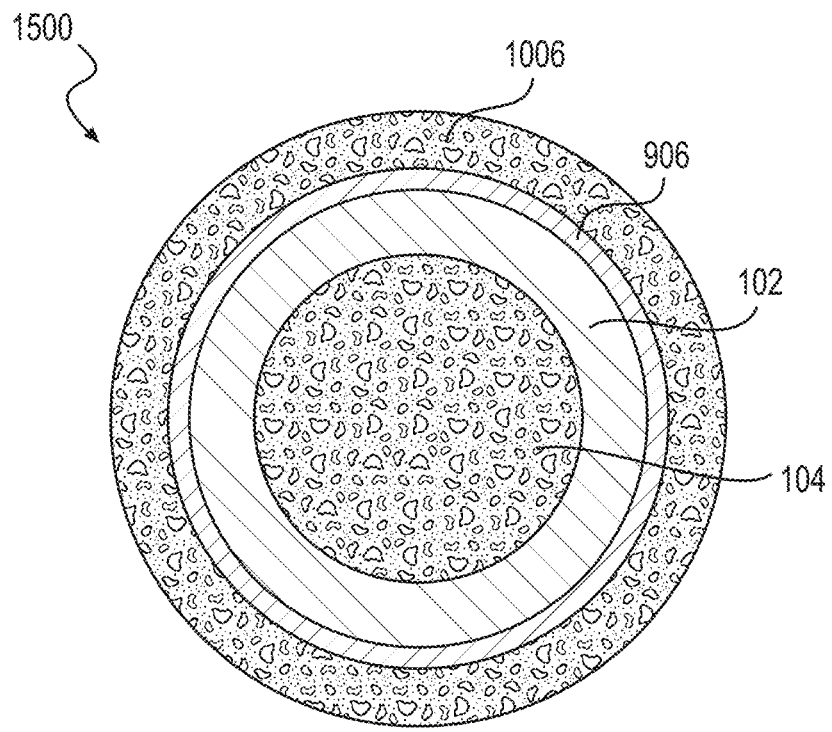
FIGS. 15-17 illustrate three particular example core-shell composite designs where the shell is a composite material according to various embodiments.
Figure 16:
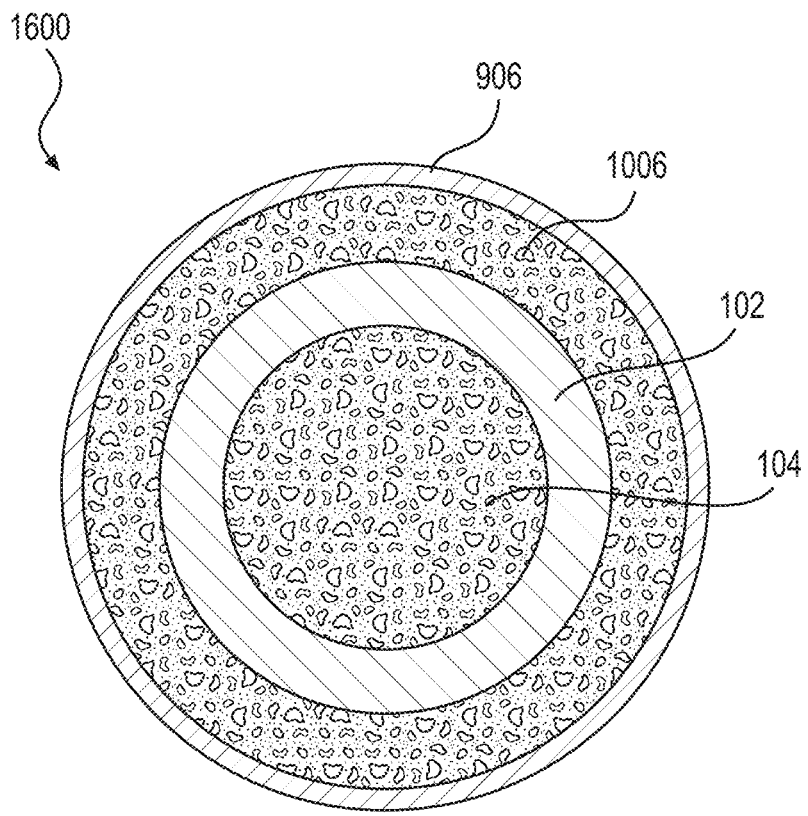
Figure 17:
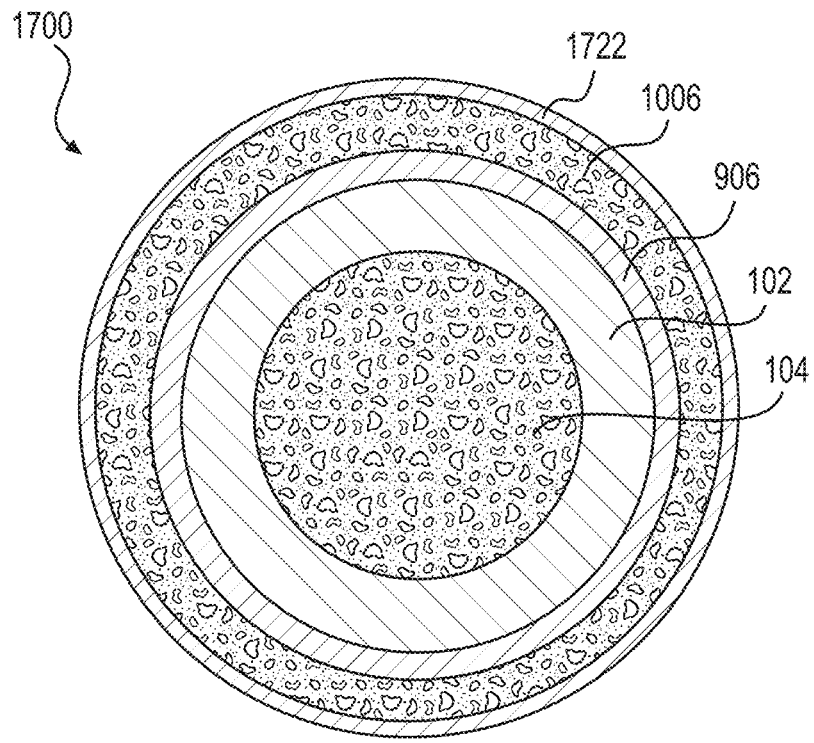

FIGS. 15-17 illustrate three particular example core-shell composite designs where the shell is a composite material according to various embodiments. FIG. 15 illustrates an example composite 1500 in which the inner layer of the shell is a protective coating layer 906 of the type described in conjunction with FIG. 9, and the outer layer is a porous coating layer 1006 of the type described in conjunction with FIG. 10. Conversely, FIG. 16 illustrates an example composite 1600 in which the inner layer of the shell is a porous coating layer 1006 of the type described in conjunction with FIG. 10, and the outer layer is a protective coating layer 906 of the type described in conjunction with FIG. 9. The outer protective coating layer 906 in FIG. 16 may offer other useful functionalities. For example, it may prevent electrolyte solvent transport into the porous component of the shell and the core, which reduces the sites of undesirable reactions between electrolyte and the composite core-shell electrode particles. Formation of an SEI on a core-shell anode operating in the potential range of 0-1.2V vs. Li/Li+ in Li-ion batteries is an example of such reactions. This outer coating layer 906 (if made impermeable to electrolyte solvent) reduces the total SEI content and irreversible electrolyte and metal ion consumption. Alternatively, the outer coating layer 906 in FIG. 16 may offer improved electrical conductivity, which may enhance capacity utilization and power characteristics of the electrodes based on the described core-shell particles. Further, the outer coating layer 906 in FIG. 16 may provide structural integrity to the core-shell particles with a volume-changing active material.

FIG. 17 illustrates an example composite 1700 that further includes an additional coating layer 1722 at least partially encasing the other layers. The additional coating layer 1722 may be formed, for example, from a material that is (i) substantially electrically conductive and (ii) substantially impermeable to electrolyte solvent molecules. In each illustration, it will again be appreciated that the active material 102 and the core 104 are shown for illustration purposes as in the more generic design of FIG. 1, but may be implemented according to any of the various embodiments disclosed herein.

In some applications, it may be advantageous to provide a solid carbon layer between porous carbon and silicon. This solid layer may be deposited in order to prevent the oxidation of the silicon surface, as discussed above. In other applications where high surface area pores are open to the electrolyte and thus available for electrolyte decomposition, it may be advantageous to deposit a solid carbon layer onto the outer surface of the porous carbon layer. This deposition seals the pores and reduces the total surface area of the material exposed to electrolyte. As a result, this deposition reduces undesirable side reactions, such as electrolyte decomposition. In still other applications, both approaches may be used to create a three-layered structure.

In addition or alternatively, an additional coating layer may be provided to impart further mechanical stability. Thus, the outermost shell layer can comprise ion permeable materials other than carbon, such as metal oxides. In some applications, where minimal volume changes of the composites is particularly important, it is advantageous for at least the outermost shell layer to experience significantly smaller volume changes (e.g., twice as small, or preferably three or more times as small) than the core active material during battery operation.

A rigid outer shell of this type can be made of carbon or ceramic coating(s) or both, for example. In one configuration, such a shell can be made of conductive carbon. The coating can be deposited by decomposition of carbon containing gases, such as hydrocarbons (the process is often called chemical vapor deposition) according to the following reaction: $2C_xH_y=2xC+yH_2$, where $C_xH_y$ is the hydrocarbon precursor gas. The carbon deposition temperature may be in the range of about 500-1000° C. After deposition, the core-shell structure can be annealed at temperatures of about 700-1100° C., but preferably about 800-1000° C. to induce additional structural ordering within the carbon, to desorb undesirable impurities, and to strengthen the bonding between core and shell.

An alternative method of depositing carbon on the surface of the active material includes catalyst-assisted carbonization of organic precursors (e.g., polysaccharide or sucrose carbonization in the presence of sulfuric acid). Yet another method of producing the carbon coating includes hydrothermal carbonization of the organic precursors on the surface of the active material at elevated temperatures (e.g., about 300-500° C.) and elevated pressures (e.g., about 1.01-70 atm). Yet another method of producing the carbon outer coating includes formation of the polymer around the active material and subsequent carbonization at elevated temperatures. In addition to a polymer coating, the active material can be initially coated with small carbon particles or multi- or single-graphene layers. Carbonization may be used to transform the polymer-carbon composite outer shell into a conductive carbon-carbon composite shell.

In addition to pure carbon, a metal-ion permeable shell in this and other described structures may be composed of or contain metal oxides, metal phosphates, metal halides or metal nitrides, including, but not limited to, the following metals: lithium (Li), aluminum (Al), cobalt (Co), boron (B), zirconium (Zr), titanium (Ti), chromium (Cr), tantalum (Ta), niobium (Nb), zinc (Zn), vanadium (V), iron (Fe), magnesium (Mg), manganese (Mn), copper (Cu), nickel (Ni), and others. They main requirements include, but are not limited to, high ionic conductivity in combination with good structural and chemical stability during electrode operation in the selected battery chemistry.

Deposition of such coatings can be performed using a variety of oxide coating deposition techniques, including physical vapor deposition, chemical vapor deposition, magnetron sputtering, atomic layer deposition, microwave-assisted deposition, wet chemistry, precipitation, solvothermal deposition, hydrothermal deposition, and others in combination with an optional annealing at elevated temperatures (e.g., greater than about 200° C.). For example, metal oxide precursors in the form of a water-soluble salt may be added to the suspension (in water) of the composites to be coated. The addition of a base (e.g., sodium hydroxide or amine) causes formation of a metal (Me) hydroxide. Active material particles suspended in the mixture may then act as nucleation sites for Me-hydroxide precipitation. Once coated with a shell of Me-hydroxide, they can be annealed in order to convert the hydroxide shell into a corresponding oxide layer that is then well-adhered to their surface.

Accordingly, throughout the various embodiments discussed herein, it will be appreciated that the shell may serve several purposes. First, it may create a mechanically rigid surface that prevents the active material from expanding outwards. Because the core may be highly porous and "soft," and the active material must expand, the active material expands inward, towards the core rather than outwards. Without the shell, the active material might expand inwards and outwards, which would cause the outer surface of the structure to change. Second, the shell may also be made ionically conductive for metal ions or the like to move to the active material. It may also be electrically conductive so that the composites making up the electrode will make better electrical contact with each other. Third, it may advantageously have good properties for forming SEI in the electrolyte used. Although the example shell material discussed most prominently above is carbon or carbon-based, certain oxides and ceramics may also be used to form shells with advantageous properties. Metals may also be used if channels for ionic conductivity are formed without compromising the mechanical integrity.

Returning again to FIG. 1, the active material 102 may be provided in various forms according to different embodiments, both for better matching a given implantation of the other composite components as well as for other reasons. In the design of FIG. 1, the active material 102 is shown in a generally amorphous or nanocrystalline (grain size below 1 micron, preferably below 500 nm) form as conformally coated onto the collapsible core 104. This amorphous or nanocrystalline form is similarly shown in FIG. 2 where the active material 102 is interspersed with the porous material of the core 104, in FIG. 3 where the active material 102 is conformally coated onto the curved linear backbones 304, in FIG. 4 where the active material 102 is conformally coated onto the curved linear backbones 404, and so on. In each of these designs, however, the active material 102 may be provided in an alternative form for different applications.

Figure 18:
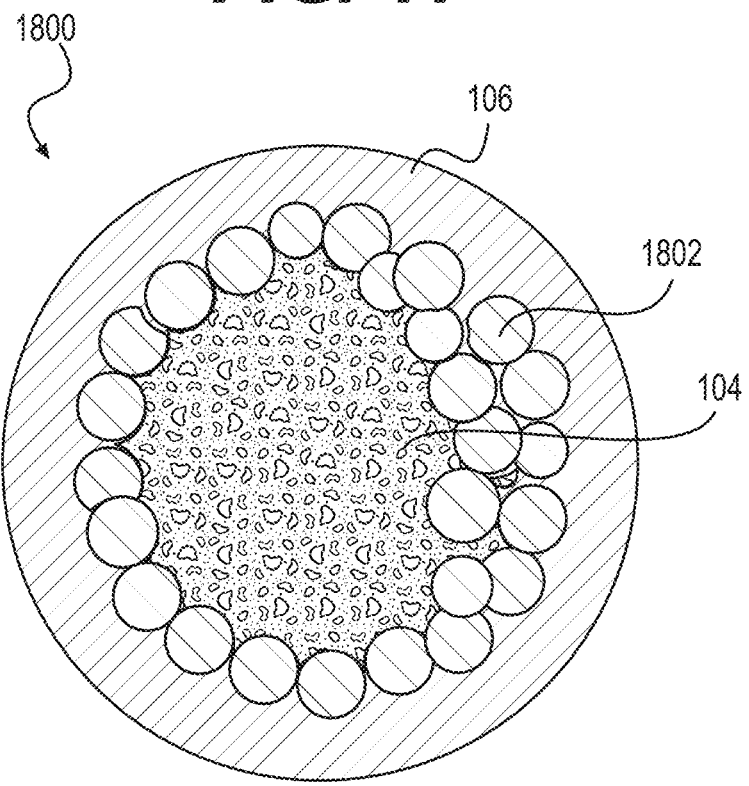
FIGS. 18-21 illustrate four example core-shell composite designs utilizing discrete particles of the active material according to various embodiments.
Figure 19:
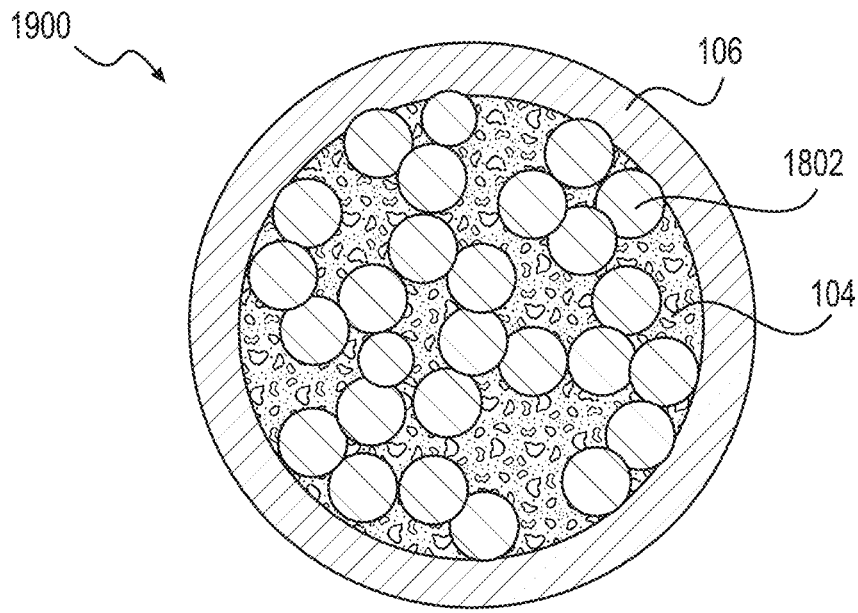
Figure 20:
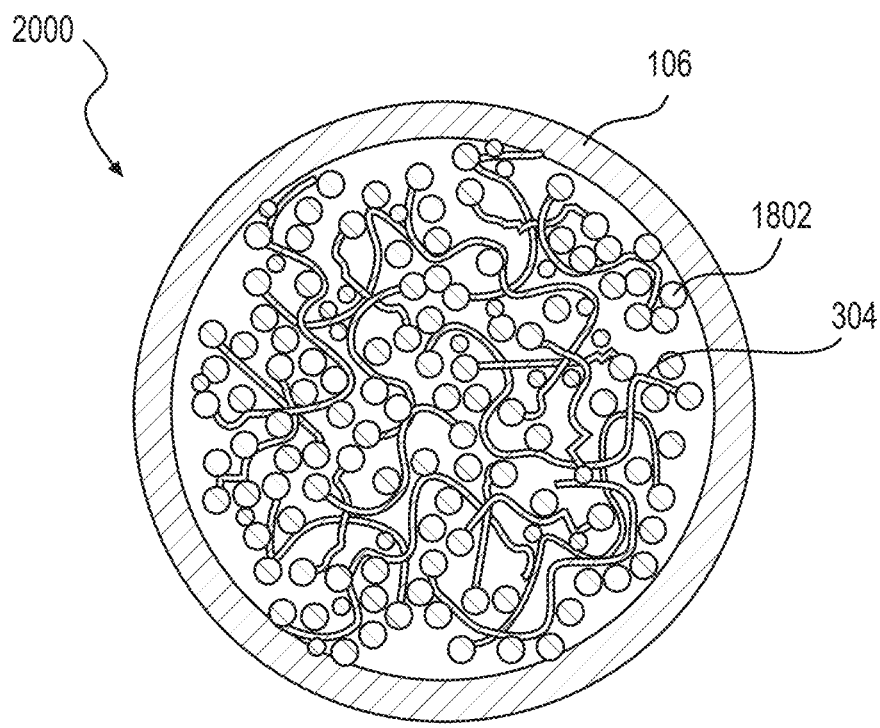
Figure 21:
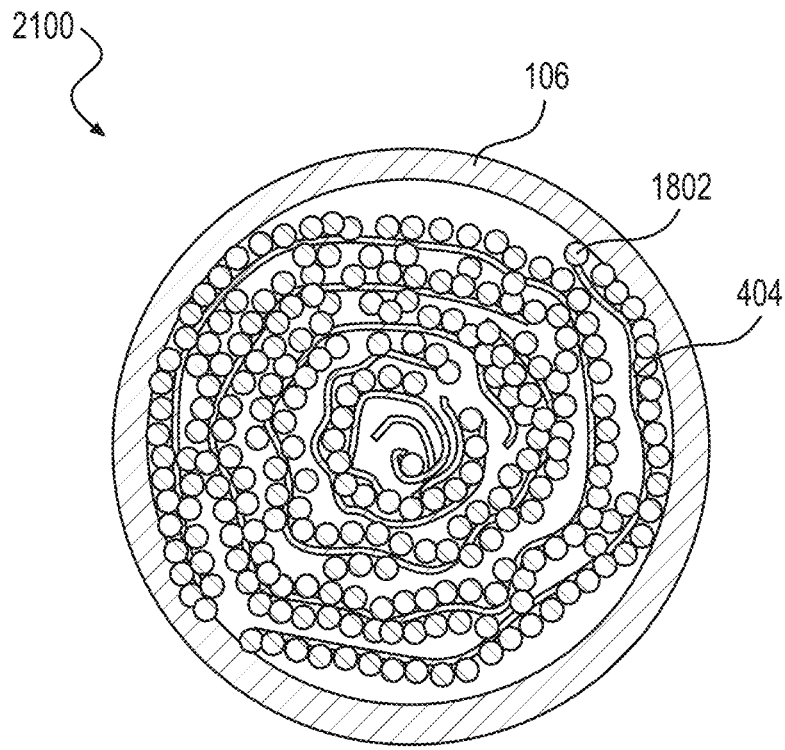

FIGS. 18-21 illustrate four example core-shell composite designs utilizing discrete particles of the active material according to various embodiments. FIG. 18 illustrates a composite 1800 that is similar to the design of FIG. 1 but with discrete particles 1802 disposed around the collapsible core 104. These particles may optionally (but preferably) be electrically connected to each other and to the shell 106. These electrical connections provide more uniform insertion and extraction of ions from the active material 102. These electrical connections may be direct (particle-to-particle) or via the collapsible core 104 (when produced from an electrically conductive material) or via an electrically conductive shell 106 (when the shell is electrically conductive). FIG. 19 illustrates a composite 1900 that is similar to the design of FIG. 2 but with discrete particles 1802 interspersed with the collapsible core 104. FIGS. 20-21 illustrate respective composites 2000 and 2100 that are similar to the designs of FIGS. 3-4, respectively, but with discrete particles 1802 interspersed with their respective cores on their different backbone substrates 304, 404.

In any case, the individual particles 1802 may be further coated with a protective coating to prevent oxidation of the active material. When the discrete particles 1802 are interspersed with the core 104, they should be electrically connected to each other and to the shell 106. These electrical connections are needed for the reversible electrochemical reduction and oxidation processes (which take place during normal battery operation) to proceed. As in the discussion above, these electrical connections may be direct (particle-to-particle) or via the collapsible core 104 (when produced from an electrically conductive material) or via electrically conductive links (such as electrically conductive particles of various shapes maintaining a direct contact between the discrete active particles 1802). In the latter two instances, there is no requirement for direct contact between the discrete active particles 1802.

It will be appreciated that these examples are merely provided as exemplary and not an exhaustive list of discrete particle design for the active material. The other designs disclosed herein for different arrangements of cores and shells may likewise be implemented using discrete active particles.

In some embodiments, the active material may be a silicon or silicon-rich material, as in a few of the examples above. In other embodiments, however, the disclosed techniques may be applied to a variety of higher capacity anode materials including not only silicon, but also other anode materials that experience significant volume changes (e.g., greater than about 7%) during insertion or extraction of their respective metal ions. Examples of such materials include: (i) heavily (and "ultra-heavily") doped silicon; (ii) group IV elements; (iii) binary silicon alloys (or mixtures) with metals; (iv) ternary silicon alloys (or mixtures) with metals; and (v) other metals and metal alloys that form alloys with metal ions such as lithium.

Heavily and ultra-heavily doped silicon include silicon doped with a high content of Group II elements, such as boron (B), aluminum (Al), gallium (Ga), indium (In), or thallium (Tl), or a high content of Group V elements, such as nitrogen (N), phosphorus (P), arsenic (As), antimony (Sb), or bismuth (Bi). By "heavily doped" and "ultra-heavily doped," it will be understood that the content of doping atoms is typically in the range of 3,000 parts per million (ppm) to 700,000 ppm, or approximately 0.3% to 70% of the total composition.

Group IV elements used to form higher capacity anode materials may include Ge, Sn, Pb, and their alloys, mixtures, or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table.

For binary silicon alloys (or mixtures) with metals, the silicon content may be in the range of approximately 20% to 99.7%. Examples of such as alloys (or mixtures) include, but are not limited to: Mg—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr—Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be doped (or heavily doped) with Group III and Group V elements. Alternatively, other Group IV elements may be used instead of silicon to form similar alloys or mixtures with metals. A combination of various Group IV elements may also be used to form such alloys or mixtures with metals.

For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. Alternatively, other Group IV elements may be used instead of silicon to form similar alloys or mixtures with metals. A combination of various Group IV elements may also used to form such alloys or mixtures with metals.

Examples of other metals and metal alloys that form alloys with lithium include, but are not limited to, Mg, Al, Ga, In, Ag, Zn, Cd, etc., as well as various combinations formed from these metals, their oxides, etc.

The disclosed techniques may also be applied to several high capacity cathode active materials, which experience significant (e.g., greater than about 7%) volume changes during insertion and extraction of metal ions (such as Li ions, for example) during the operation of a metal-ion cell (such as a Li-ion cell).

Examples of high capacity cathode materials include, but are not limited to, conversion-type cathodes, such as metal fluorides, metal oxy-fluorides, various other metal halides and oxy-halides (such as metal chlorides, metal bromides, metal iodides) and others. Examples of metal fluorides based on a single metal include, but are not limited to, $FeF_2$ (having a specific capacity of 571 mAh/g in Li-ion battery applications), $FeF_3$ (having a specific capacity of 712 mAh/g in Li-ion battery applications), $MnF_3$ (having a specific capacity of 719 mAh/g in Li-ion battery applications), $CuF_2$ (having a specific capacity of 528 mAh/g in Li-ion battery applications), and $NiF_2$ (having a specific capacity of 554 mAh/g in Li-ion battery applications). It will be appreciated that metal halides may include two or more different metals. For example, Fe and Mn or Ni and Co or Ni and Mn and Co. The metal halides mentioned above may also contain lithium (particularly in the case of Li-ion batteries) or other metals for the corresponding metal-ion batteries. Finally, metal halide active materials may comprise both metal atoms in a metallic form and in the form of a metal halide. For example, the metal halide-based active materials may comprise a mixture of a pure metal (such as Fe) and a lithium halide (such as LiF) in case of a Li-ion battery (or another metal halide in case of a metal-ion battery, such as sodium halide (such as NaF) in case of a Na-ion battery or magnesium halide ($MgF_2$) in case of a Mg-ion battery). The pure metal in this example should ideally form an electrically connected array of metal species. For example, electrically connected metal nanoparticles (such Fe nanoparticles) or electrically connected curved metal nanowires or metal dendritic particles or metal nanosheets. Alternatively, the metal-1 component of the active (metal-1/metal-2 halide) mixture can form a curved linear or curved planar backbone onto which the metal-2 halide is deposited.

The disclosed techniques may also be applied to several high capacity anode and cathode active materials that experience significant volume changes when used in battery chemistries other than metal-ion batteries.

Figure 22:
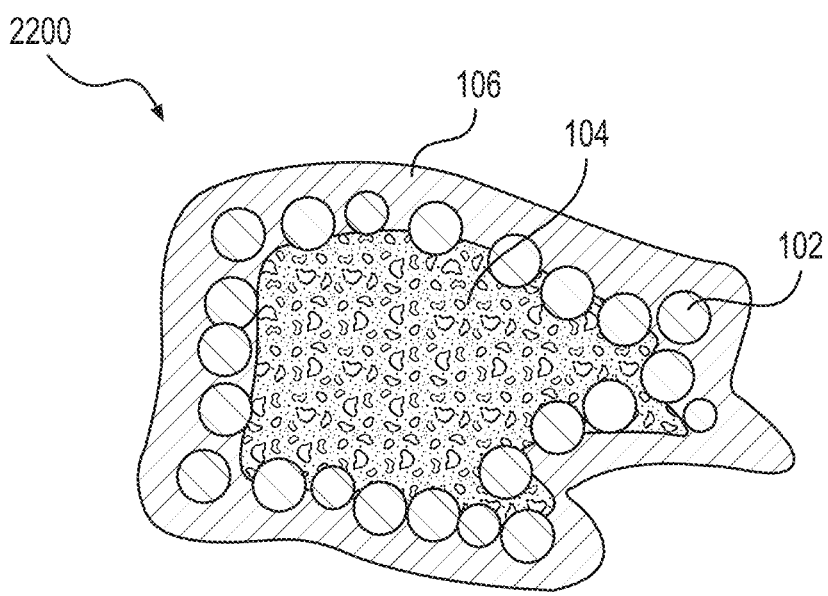
FIG. 22 illustrates a still further example core-shell composite design having an irregular shape according to other embodiments.

FIG. 22 illustrates a still further example core-shell composite design having an irregular shape according to other embodiments. As shown, the composite 2200 is compositionally equivalent to the design of FIG. 1 and includes an active material 102, a collapsible core 104, and a shell 106. It is, however, irregularly shaped to demonstrate that the generally spherical shape of various composites illustrated in other figures is not required and that other, even irregular shapes are contemplated.

Figure 23:
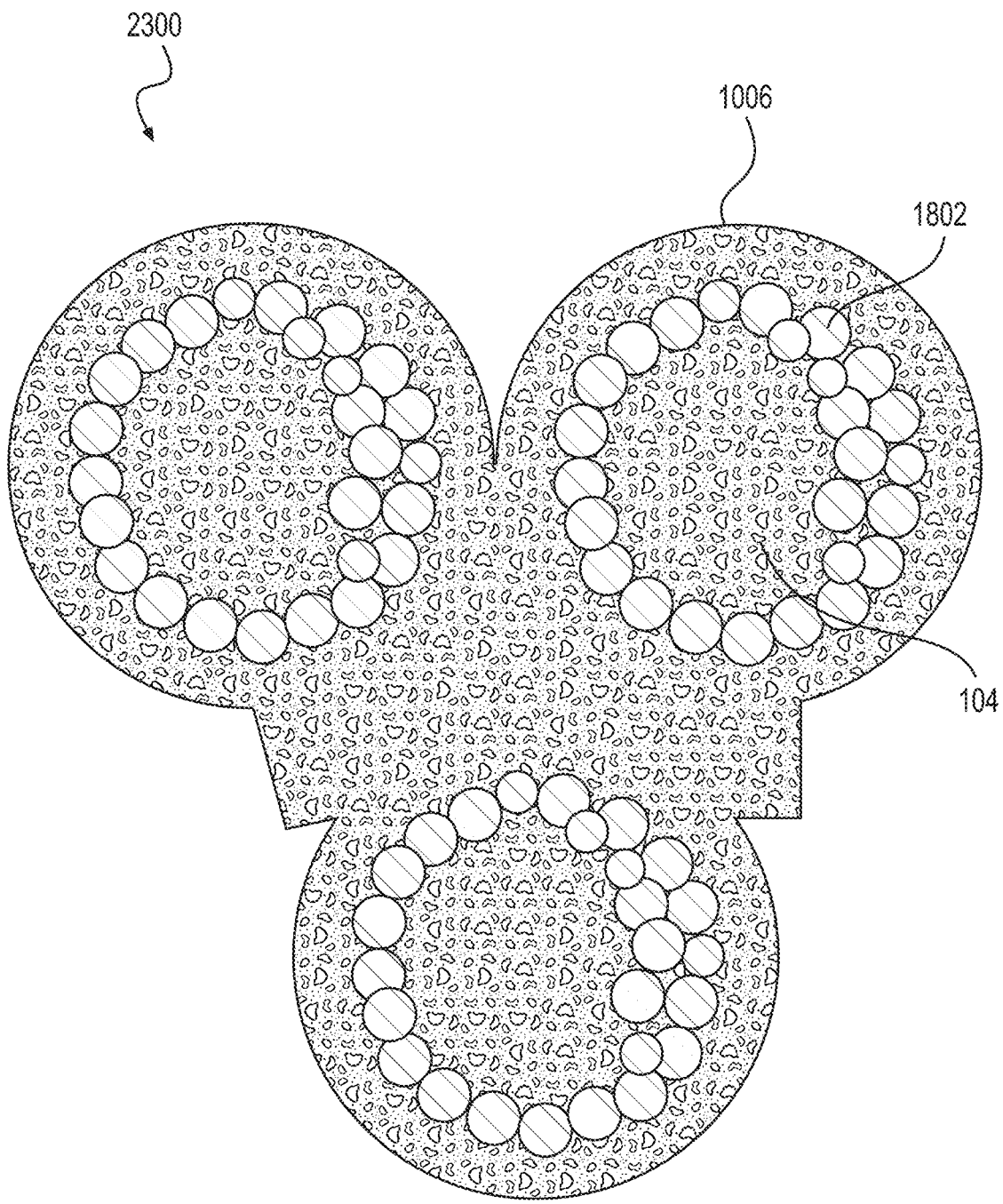
FIG. 23 illustrates an electrode composition formed from agglomerated core-shell composites according to certain embodiments.

FIG. 23 illustrates an electrode composition formed from agglomerated core-shell composites according to certain embodiments. As shown, each composite of the agglomeration 2300 includes active material particles 1802, a collapsible core 104, and a porous shell 1006, similar to various design aspects discussed above. In this design, the porous material for the collapsible core 104 and the porous shell 1006 are selected to be the same. Accordingly, as demonstrated in the figure, a design incorporating such elements effectively blurs the distinction between core and shell, leading to a structure that is equivalent to an agglomeration of composites formed without shells per se (i.e., in that the core of one composite acts as a shell for another composite in the agglomeration by providing an equivalent accommodation for volume changes). Such a design is contemplated herein as well.

Figure 24:
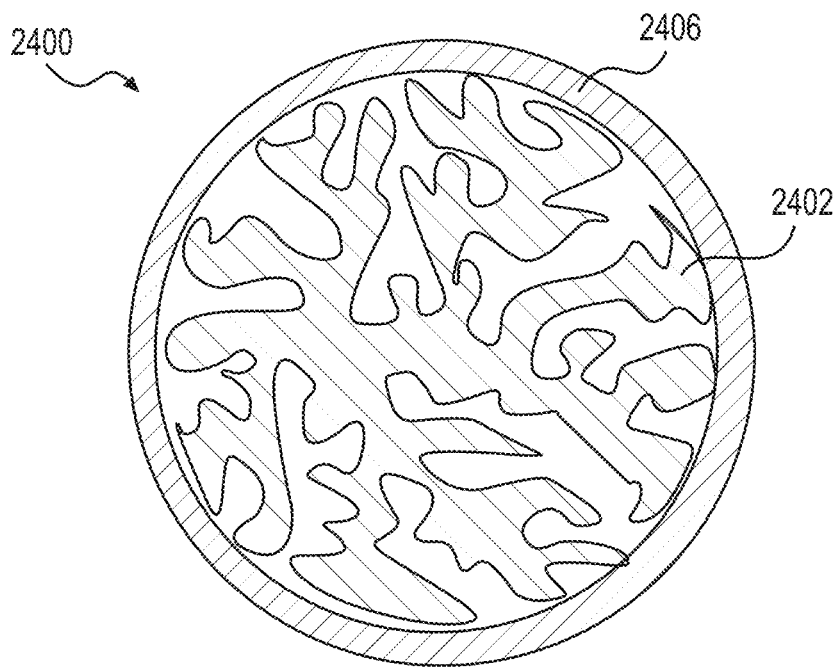
FIGS. 24-25 illustrate still further example composite designs according to other embodiments.
Figure 25:
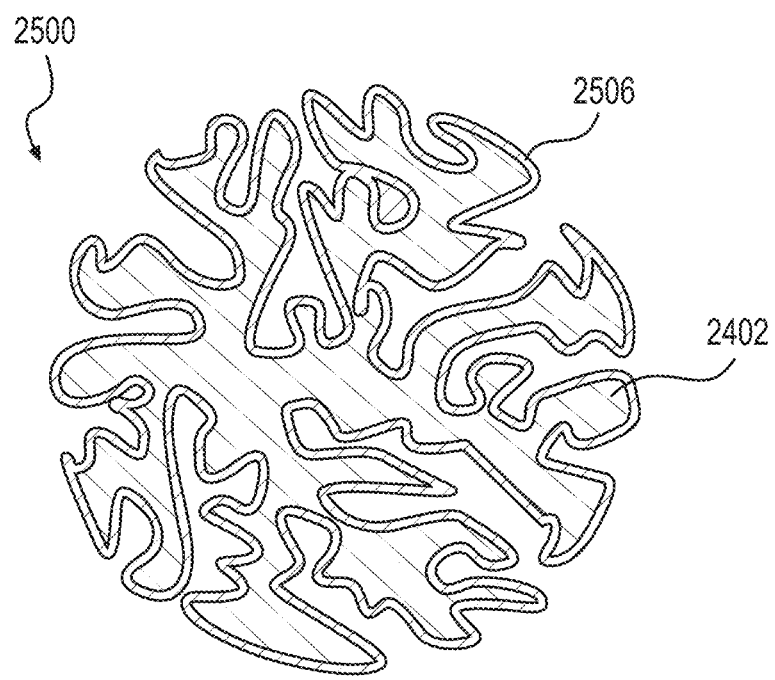

FIGS. 24-25 illustrate still further example composite designs according to other embodiments. FIG. 24 illustrates a design 2400 including an example porous active material powder structure 2402 encased in a shell 2406 but in which volume changes are accommodated by the porous nature of the active material itself rather than a collapsible core. FIG. 25 illustrates a design 2500 including a similar example porous active material powder structure 2402 but with a shell 2506 disposed as a conformal coating.

In general, it is noted that composite particles of the type discussed herein can be synthesized from about 50 nm to about 50 μm in size. The core and shells can be designed to vary in thickness or diameter from about 1 nm to about 20 μm. Electrode designs with a relatively uniform size distribution of the composites may be beneficial, as properties remain consistent from particle to particle. However, it may be advantageous for other embodiments to create structures of two, three, or more uniform diameters and mix them together to allow for high packing density when electrodes are fabricated. Because these composites change very little if at all in size during cycling on the outer surface, the particle-to-particle connection can stay intact with strong or weak binders.

Composite size is driven by a multitude of factors. In particular, additive CVD processes tend to bind adjacent particles together, forming large agglomerates. This is true especially in bulk powder processing. Agglomeration of adjacent composites can be mitigated during bulk powder processing in all synthesis processes by any combination of tumble agitation of the entire powder volume, entrainment of the composites in a fluid flow, dropping composites to maintain separation between them, vibratory agitation, milling, electrostatic charging, or other means. Composite particle size can also be controlled by reducing it after synthesis using milling techniques.

Figure 26A:
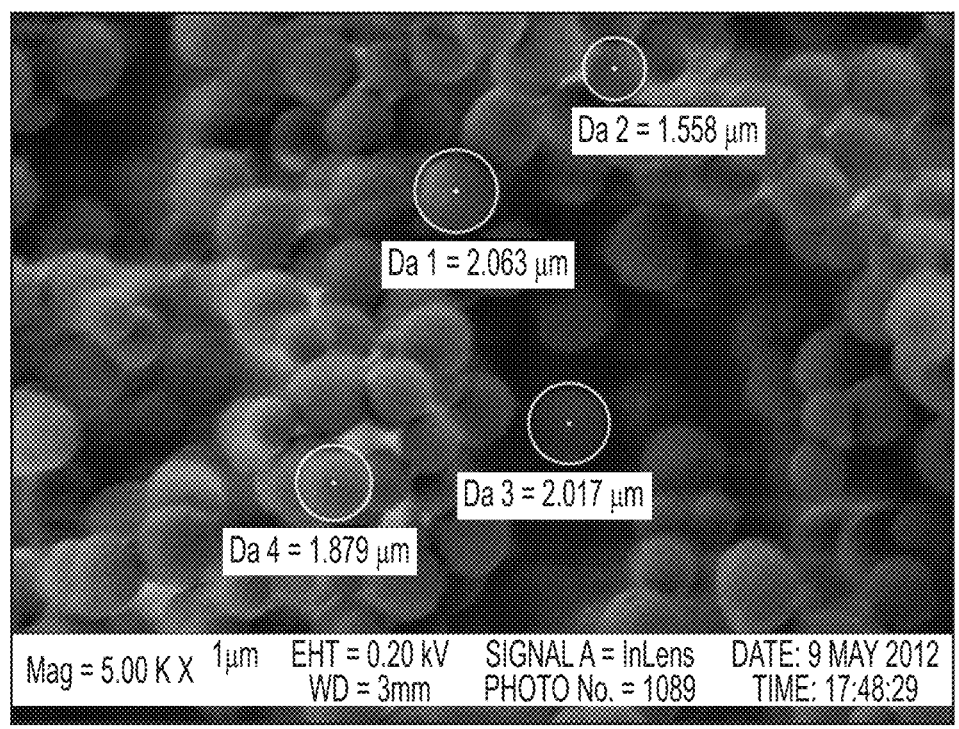
FIGS. 26A-26E provide experimental images showing various phases of formation for a particular example embodiment.
Figure 26B:
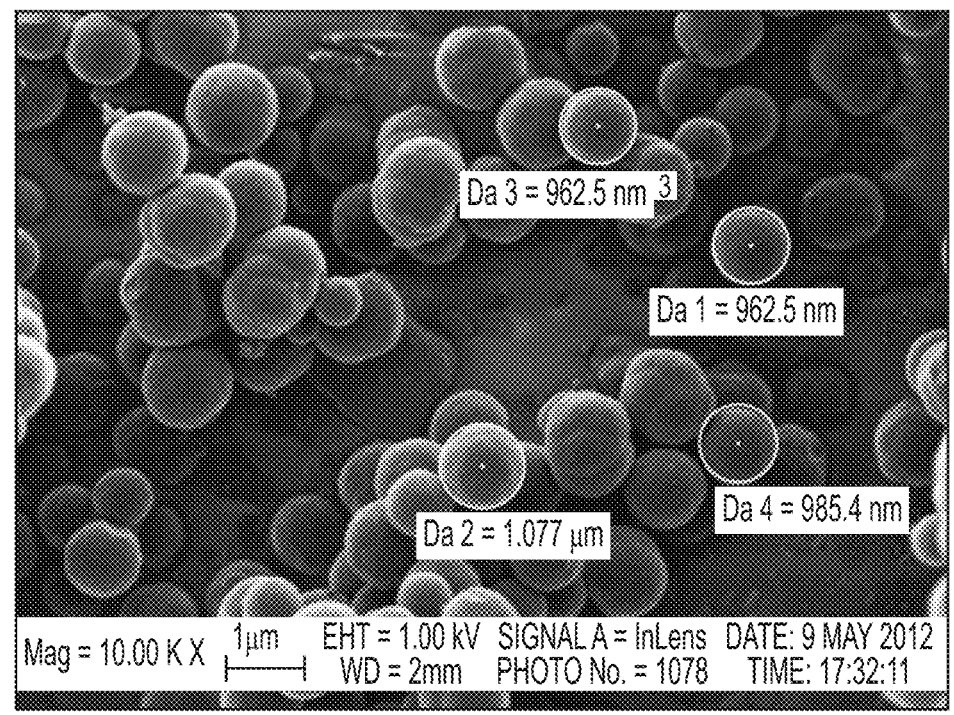
Figure 26C:
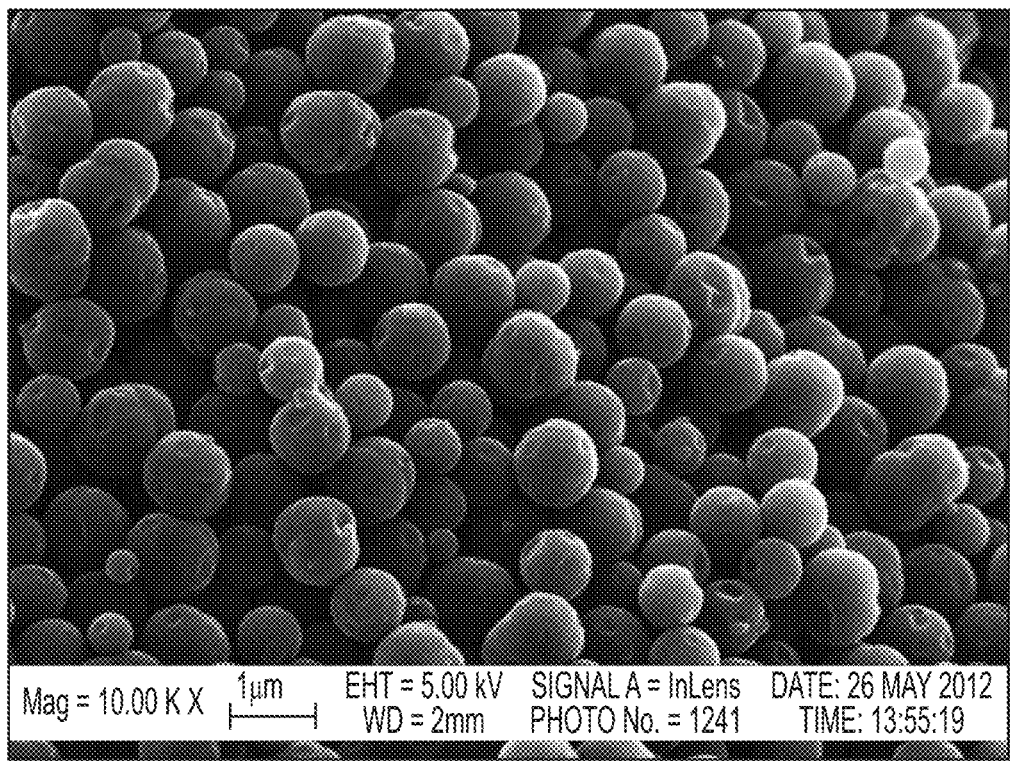
Figure 26D:
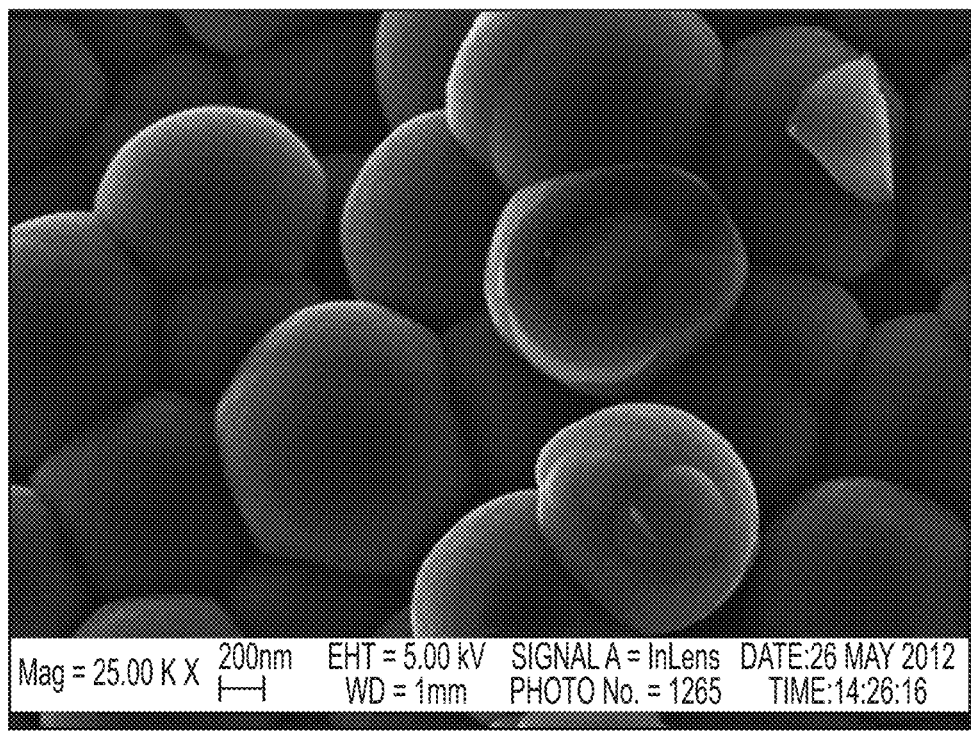
Figure 26E:
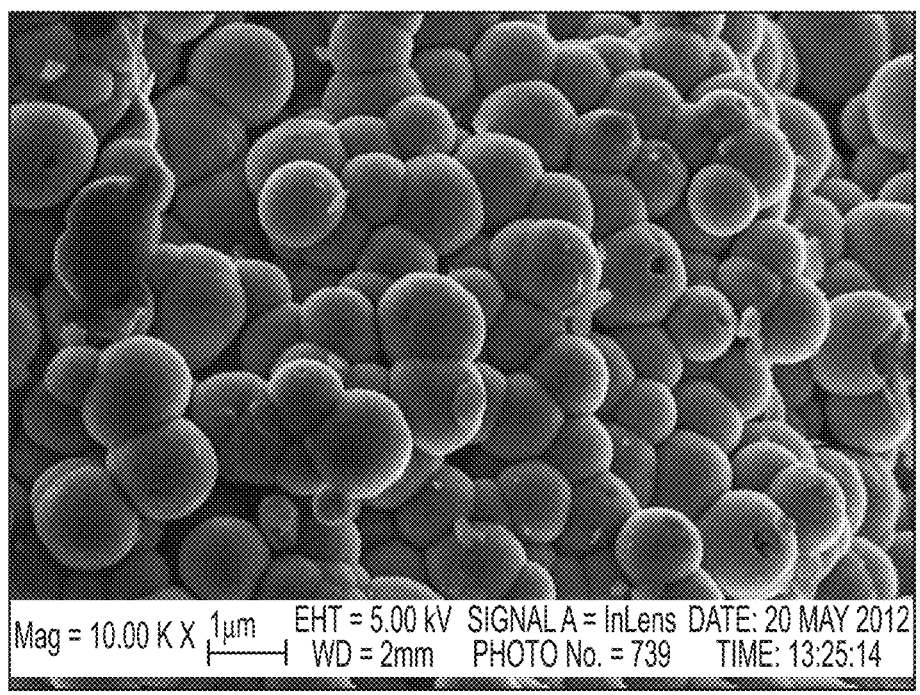

FIGS. 26A-26E provide experimental images showing various phases of formation for a particular example embodiment, including (a) polymerized core precursor particles (oxidized polyDVB) (FIG. 26A), (b) carbonized core particles (FIG. 26B), (c) activated core particles (FIG. 26C), (d) silicon deposited on activated carbon core particles (FIG. 26D), and (e) a carbon shell deposited on silicon on activated carbon core particles (FIG. 26E). It will be appreciated that the example design shown here is for illustration purposes only, and is not intended to represent the only or the best implementation.

Figure 27:
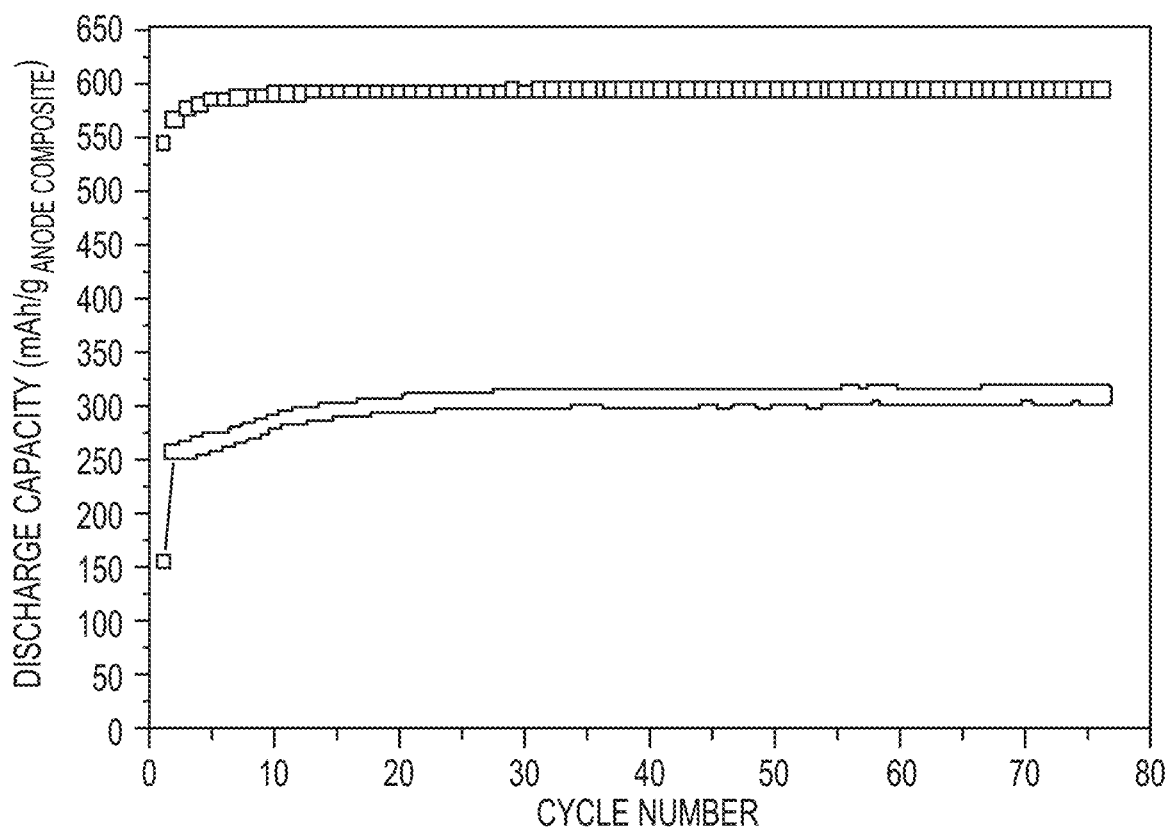
FIG. 27 provides electrochemical performance data of an example anode composite containing high surface area silicon nanoparticles.

FIG. 27 provides electrochemical performance data of an example anode composite containing high surface area silicon nanoparticles. Discharge capacity is shown as a function of cycle number and the presence or absence of a protective carbon layer deposited on the fresh silicon surface without its exposure to air. The positive impact of the protective layer on the reversible capacity is evident. Without the protective coating over 60% of the silicon atoms became oxidized, which resulted in a significant reduction of the capacity utilization.

Figure 28:
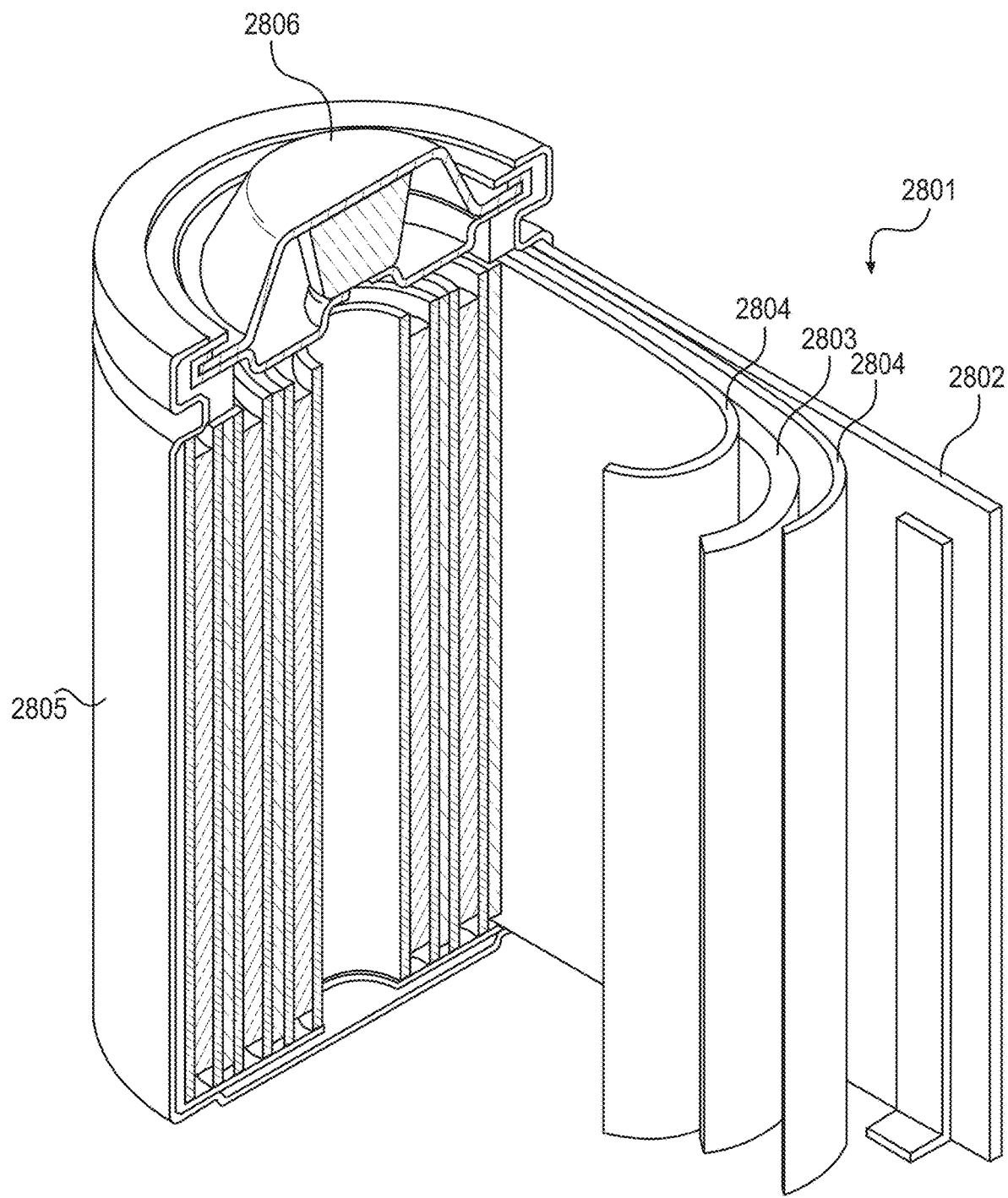
FIG. 28 illustrates an example battery (e.g., Li-ion) in which the components, materials, methods, and other techniques described herein, or combinations thereof, may be applied according to various embodiments.

FIG. 28 illustrates an example battery (e.g., Li-ion) in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 2801 includes a negative anode 2802, a positive cathode 2803, a separator 2804 interposed between the anode 2802 and the cathode 2803, an electrolyte (not shown) impregnating the separator 2804, a battery case 2805, and a sealing member 2806 sealing the battery case 2805.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A battery anode composition comprising composite particles, each of the composite particles comprising:
   silicon-comprising active material;
   a porous core comprising carbon disposed in combination with the silicon-comprising active material; and
   a protective coating at least partially encasing the silicon-comprising active material and the porous core, the protective coating comprising carbon,
   wherein:
   the silicon-comprising active material is amorphous; and
   the porous core comprises curved, multi-layered graphene material, with at least some of the silicon-comprising active material coating two or more internal pores of the porous core that are defined by the curved, multi-layered graphene material.

2. The battery anode composition of claim 1, wherein the silicon-comprising active material is formed by thermal decomposition of a silane.

3. The battery anode composition of claim 1, wherein the protective coating is formed by chemical vapor deposition of a hydrocarbon precursor.

4. The battery anode composition of claim 3, wherein the hydrocarbon precursor comprises ethylene ($C_2H_4$), acetylene ($C_2H_2$), and/or propylene ($C_3H_6$).

5. The battery anode composition of claim 1, wherein the protective coating further comprises a ceramic.

6. The battery anode composition of claim 1, wherein the protective coating is configured to prevent oxidation of the silicon-comprising active material.

7. The battery anode composition of claim 1, wherein a thickness of the protective coating is at least about 1 nm.

8. The battery anode composition of claim 1, wherein the composite particles are characterized by an average size in a range of about 50 nm to about 50 μm.

9. The battery anode composition of claim 1, wherein the composite particles are irregularly shaped.

10. The battery anode composition of claim 1, wherein at least some of the silicon-comprising active material is present as nanoparticles of the silicon-comprising active material.

11. A Li-ion battery, comprising:
    an anode comprising the battery anode composition of claim 1;
    a cathode; and
    a separator and an electrolyte between the anode and the cathode.

12. A method comprising:
    providing particles comprising carbon;
    activating the particles in an oxygen-comprising environment at elevated temperatures to form activated particles;
    depositing silicon-comprising material on the activated particles to form silicon-comprising active material on the activated particles; and
    depositing a protective coating on the silicon-comprising active material and the activated particles to form composite particles, the protective coating at least partially encasing the silicon-comprising active material and the activated particles, the protective coating comprising carbon,
    wherein:
    the silicon-comprising active material is amorphous; and
    each of the composite particles comprises curved, multi-layered graphene material, with at least some of the silicon-comprising active material coating two or more internal pores of a porous core that are defined by the curved, multi-layered graphene material.

13. The method of claim 12, wherein the elevated temperatures are in a range of about 500° C. to about 1100° C.

14. The method of claim 12, wherein the oxygen-comprising environment comprises $CO_2$ gas or $H_2O$ vapors.

15. The method of claim 12, wherein the depositing of the silicon comprises thermal decomposition of a silane.

16. The method of claim 12, wherein the depositing of the protective coating comprises chemical vapor deposition of a hydrocarbon precursor.

17. The method of claim 16, wherein the hydrocarbon precursor comprises ethylene ($C_2H_4$), acetylene ($C_2H_2$), and/or propylene ($C_3H_6$).

18. The method of claim 16, wherein the chemical vapor deposition is carried out at carbon deposition temperatures in a range of about 500° C. to about 1000° C.

19. The method of claim 16, wherein the chemical vapor deposition is carried out at sub-atmospheric pressures in a range of about 0.01 torr to about 300 torr.

20. The method of claim 12, wherein the depositing of the protective coating is carried out without exposing the silicon-comprising active material to oxidizing media.

21. The method of claim 12, wherein the protective coating comprises a ceramic.

22. The method of claim 12, wherein the protective coating prevents oxidation of the silicon-comprising active material.

23. The method of claim 12, wherein a thickness of the protective coating is at least about 1 nm.

24. The method of claim 12, wherein the composite particles are characterized by an average size in a range of about 50 nm to about 50 μm.

25. The method of claim 12, wherein the composite particles are irregularly shaped.

26. The method of claim 12, wherein at least some of the silicon-comprising active material is present as nanoparticles of the silicon-comprising active material.

27. The method of claim 12, wherein the depositing of the silicon-comprising material is accompanied by tumble agitation of the activated particles, entrainment of the activated particles in a fluid flow, and/or vibratory agitation of the activated particles.

28. The method of claim 12, wherein the depositing of the protective coating is accompanied by tumble agitation of the silicon-comprising active material and the activated particles, entrainment of the silicon-comprising active material and the activated particles in a fluid flow, and/or vibratory agitation of the silicon-comprising active material and the activated particles.

29. The method of claim 12, further comprising:
carrying out milling on the composite particles.

30. The method of claim 12, further comprising:
forming an anode using the composite particles; and
assembling a Li-ion battery from the anode, a cathode, and a separator and an electrolyte between the anode and the cathode.

* * * * *